(12) United States Patent
Kiyama et al.

(10) Patent No.: US 10,558,451 B2
(45) Date of Patent: Feb. 11, 2020

(54) SOFTWARE UPDATE SYSTEM AND SERVER

(71) Applicant: Hitachi, Ltd., Tokyo (JP)

(72) Inventors: Noboru Kiyama, Tokyo (JP); Atsushi Katou, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 15/696,665

(22) Filed: Sep. 6, 2017

(65) Prior Publication Data

US 2018/0074811 A1 Mar. 15, 2018

(30) Foreign Application Priority Data

Sep. 15, 2016 (JP) ................................. 2016-180678

(51) Int. Cl.
| | |
|---|---|
| *G06F 8/65* | (2018.01) |
| *G06F 11/14* | (2006.01) |
| *G06F 8/654* | (2018.01) |
| *B60W 50/00* | (2006.01) |

(52) U.S. Cl.
CPC ............ *G06F 8/65* (2013.01); *G06F 11/1433* (2013.01); *B60W 50/0098* (2013.01); *G06F 8/654* (2018.02); *G06F 8/66* (2013.01)

(58) Field of Classification Search
CPC ........ G06F 8/65; G06F 8/656; G06F 11/1433; G06F 8/658; G06F 9/44536
See application file for complete search history.

(56) References Cited

U.S. PATENT DOCUMENTS

| | | | | |
|---|---|---|---|---|
| 8,635,263 | B2* | 1/2014 | Shikano | H04L 67/12 |
| | | | | 370/328 |
| 9,715,378 | B2* | 7/2017 | Dickerson | G06F 8/65 |
| 9,787,800 | B2* | 10/2017 | e Costa | H04L 67/34 |
| 9,898,587 | B2* | 2/2018 | Hahn | G06F 21/10 |
| 9,910,651 | B2* | 3/2018 | Lopez | G06F 8/60 |
| 2005/0262498 | A1 | 11/2005 | Ferguson et al. | |

(Continued)

FOREIGN PATENT DOCUMENTS

JP 2015-041334 A 3/2015

OTHER PUBLICATIONS

Heshann A. Odat et al.; Firmware Over the Air for Automotive Fotamotive; IEEE; pp. 130-139; retrieved on Oct. 3, 2019 (Year: 2014).*

(Continued)

*Primary Examiner* — Geoffrey R St Leger
*Assistant Examiner* — Cuong V Luu
(74) *Attorney, Agent, or Firm* — Mattingly & Malur, PC

(57) ABSTRACT

A telematics center includes an update software distribution unit that distributes update software for updating software of an ECU to a software updating device. The software updating device includes a storage device that stores update software distributed from the telematics center and stores update information regarding influence on the operation of a vehicle in a case where the updating of the software of the ECU is not successful and an ECU software updating unit that updates the software of the ECU by using the update software stored in the storage device, and controls the operation of the ECU software updating unit on the basis of the update information stored in the storage device.

8 Claims, 12 Drawing Sheets

(56) References Cited

U.S. PATENT DOCUMENTS

| | | | | |
|---|---|---|---|---|
| 2011/0289133 | A1* | 11/2011 | Shikano | H04L 67/12 709/202 |
| 2012/0216294 | A1* | 8/2012 | Hahn | G06F 21/10 726/27 |
| 2015/0169311 | A1* | 6/2015 | Dickerson | G06F 8/65 717/170 |
| 2016/0351056 | A1* | 12/2016 | Herbach | G08G 1/00 |
| 2017/0060562 | A1* | 3/2017 | Lopez | G06F 8/60 |
| 2017/0185391 | A1* | 6/2017 | Davey | G06F 8/65 |
| 2017/0195459 | A1* | 7/2017 | e Costa | H04L 67/34 |
| 2017/0220404 | A1* | 8/2017 | Polar Seminario | G06F 8/654 |
| 2018/0102939 | A1* | 4/2018 | Kim | H04L 67/34 |

OTHER PUBLICATIONS

Dennis K. Nilsson et al.; A Framework for Self-Verification of Firmware Updates over the Air in Vehicle ECUs; IEEE; 5 pages; retrieved on Oct. 3, 2019 (Year: 2008).*

Yuichi Komano et al.; Efficient and Secure Firmware Update Rollback Method for Vehicular Devices; ISPEC; pp. 455-467 (Year: 2018).*

Extended European Search Report received in corresponding European Application No. 17191322.1 dated Nov. 24, 2017.

* cited by examiner

SOFTWARE UPDATE SYSTEM AND SERVER

BACKGROUND OF THE INVENTION

Field of the Invention

The present invention relates to a software update system and a server.

Background Art

In recent years, the scale of software mounted on an electronic control unit (ECU) for an automobile has been increased along with the progress of a driving support function or an automatic driving technique. Accordingly, the number of times of recall due to a defect of software of the ECU and the number of automobiles recalled have increased. On the other hand, along with the progress of a communication network, connected cars in which automobiles are connected to center systems and the like in a wireless manner also show signs of spread.

In such a situation, a wireless remote software update technique (over the air: OTA) which has recently been used in mobile phones, televisions, and the like has been applied to automobiles, and there have been increasing demands for a remote software update technique for an automobile for remotely updating software of in-vehicle equipment such as an ECU. JP-A-2015-41334 discloses a system that remotely updates software of a telematics in-vehicle terminal, as an example of in-vehicle equipment.

SUMMARY OF THE INVENTION

In the system disclosed in JP-A-2015-41334, recovery processing for returning software used before updating to a state before the updating by downloading the software from a server is executed in a case where the updating of the software is not successful. For this reason, a good communication state is required in order to perform the recovery processing, and it is not possible to perform the recovery processing under an environment in which a radio wave condition is bad, such as an undergroundparking lot. When the updating of the software is not successful under such an environment in which recovery processing cannot be performed, it is not possible to use the in-vehicle equipment, and the subsequent operation of an automobile may also be restricted. However, a user cannot know countermeasures thereof. In addition, when the system disclosed in JP-A-2015-41334 is applied to in-vehicle equipment other than the telematics in-vehicle terminal, there is a possibility that the operation of an automobile is greatly influenced, such as the automobile falls into a travel-disabled state in a case where the updating of the software is not successful, depending on the type of in-vehicle equipment. For this reason, a condition in which the updating of the software is executable is limited. Therefore, it is not possible to realize the updating of the software of the in-vehicle equipment based on OTA which is easy for a user to utilize.

According to an aspect of the present invention, there is provided a software update system that manages updating of software of a control device mounted on a vehicle, the software update system including a software updating device which is mounted on the vehicle, and a server which communicates with the software updating device through a network, and in which the server includes an update software distribution unit that distributes update software for updating the software of the control device to the software updating device, and in which the software updating device includes a storage device that stores the update software distributed from the server and stores update information regarding influence on operation of the vehicle in a case where the updating of the software of the control device is not successful, and a software updating unit that updates the software of the control device by using the update software stored in the storage device, and controls operation of the software updating unit on the basis of the update information stored in the storage device.

According to another aspect of the present invention, there is provided a server that manages updating of software of a control device mounted on a vehicle, the server including an update software distribution unit that distributes update software for updating the software of the control device to the vehicle, and a storage device that stores update information regarding influence of operation of the vehicle in a case where the updating of the software of the control device is not successful.

According to the invention, it is possible to realize the updating of software of in-vehicle equipment based on OTA which is easy for a user to utilize.

DETAILED DESCRIPTION OF THE INVENTION

Hereinafter, embodiments of the invention will be described with reference to FIGS. 1 to 12.

First Embodiment

Figure 1:
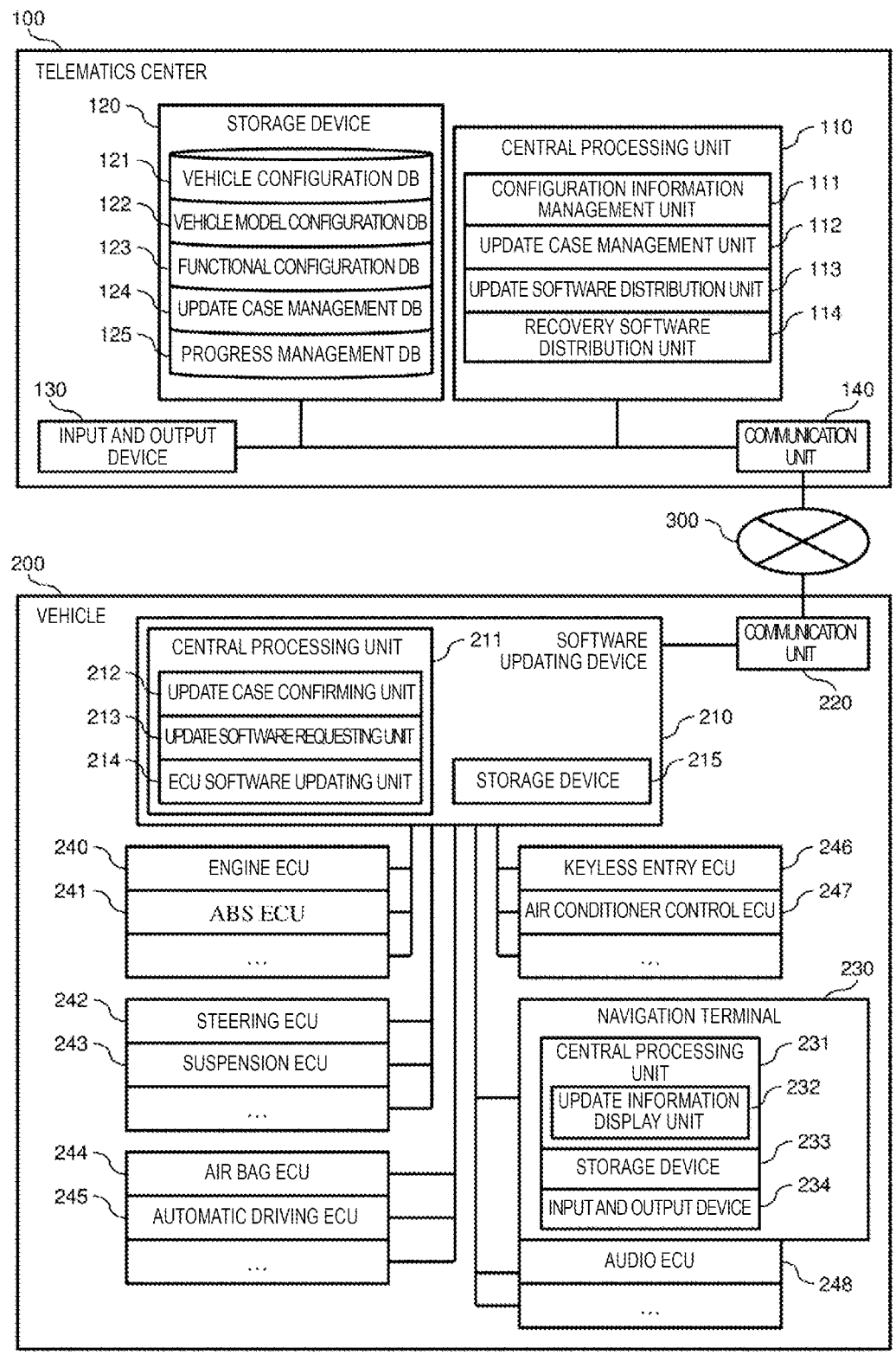
FIG. 1 is a diagram illustrating an example of a configuration of a software update system according to a first embodiment of the invention.

FIG. 1 is a diagram illustrating an example of a configuration of a software update system according to a first embodiment of the invention. The software update system illustrated in FIG. 1 manages the updating of software of various ECUs mounted on a vehicle 200, and includes a telematics center 100 which is a server and a software updating device 210 mounted on the vehicle 200. The telematics center 100 and the software updating device 210 are connected to each other through a network 300 and a communication unit 220 mounted on the vehicle 200. The telematics center 100 and the software updating device 210 can communicate with each other by such connection. Examples of the network 300 include near-field wireless communication such as a mobile phone network, an Internet network, and a wireless local area network (LAN), or a network constituted by a combination of the plurality of networks. Meanwhile, FIG. 1 illustrates only one vehicle 200 on which the software updating device 210 is mounted. However, the number of vehicles 200 is not limited to one, and the plurality of vehicles 200 may have individual software updating devices 210 mounted thereon, and may be connected to the telematics center 100.

The telematics center 100 distributes update software for update software of various ECUs mounted on the vehicle 200 to the vehicle 200 through the network 300. The telematics center 100 includes a central processing unit 110, a storage device 120, an input and output device 130, and a communication unit 140.

The central processing unit 110 is constituted by, for example, a central processing unit (CPU), a random access memory (RAM), or the like, and executes a predetermined operation program to perform a process of realizing functions of the telematics center 100. The central processing unit 110 includes a configuration information management unit 111, an update case management unit 112, an update software distribution unit 113, and a recovery software distribution unit 114 as the functions thereof.

The configuration information management unit 111 manages pieces of information of a vehicle configuration DB 121, a vehicle model configuration DB 122, and a functional configuration DB 123, to be described later, which are stored in the storage device 120, and performs the registration, change, and deletion of the pieces of information as necessary. The update case management unit 112 manages an update case indicating update contents of software for each ECU of the vehicle 200. The update software distribution unit 113 distributes update software to the vehicle 200 in accordance with a request from the vehicle 200. The recovery software distribution unit 114 distributes recovery software for returning software of any ECU mounted on the vehicle 200 to a state before updating in a case where the updating of the software for any ECU mounted on the vehicle 200 has not been successful. Meanwhile, operations of these configurations will be described later in detail.

The storage device 120 is constituted by, for example, a hard disk drive (HDD), a solid state drive (SSD), a flash memory, a read only memory (ROM), or the like. The storage device 120 stores a program executed by the central processing unit 110, a data group necessary for the execution of the program, and the like. The data group stored in the storage device 120 includes a vehicle configuration DB 121, a vehicle model configuration DB 122, a functional configuration DB 123, an update case management DB 124, a progress management DB 125, and the like.

The vehicle configuration DB 121 accumulates vehicle configuration information which is information for managing ECUs mounted on the respective vehicles 200 and the version of software. The vehicle model configuration DB 122 accumulates vehicle model configuration information which is information for managing the ECUs mounted on the respective vehicles 200 in units of vehicle models. The functional configuration DB 123 accumulates functional configuration information which is information for managing what influence the respective ECUs exert on the operation of the vehicle 200. The update case management DB 124 accumulates information for managing a software update case of the ECU. Meanwhile, the update case management DB 124 accumulates not only the information of the software update case but also update software to be distributed to each vehicle 200. The update software is registered in advance through the input and output device 130 or the like, and is thus accumulated in the update case management DB 124. The progress management DB 125 actually starts to distribute the update software to each vehicle 200 and then accumulates information for managing in which vehicle updating has been already completed.

The input and output device 130 is constituted by a combination of a touch panel, a keyboard, a mouse, and the like, and functions as an input unit and a display unit.

The communication unit 140 is constituted by a network card or the like based on a communication standard used in the network 300, or the like. The network card is based on a communication standard necessary for wired communication such as a wired local area network (LAN), wireless communication such as a wireless LAN, or both the wired and wireless communication. The communication unit 140 transmits and receives data to and from the vehicle 200 through the network 300 on the basis of various protocols.

The vehicle 200 includes the software updating device 210, the communication unit 220, a navigation terminal 230, an engine ECU 240, an ABSECU 241, a steering ECU 242, a suspension ECU 243, an air bag ECU 244, an automatic driving ECU 245, a keyless entry ECU 246, an air conditioner control ECU 247, and an audio ECU 248.

The engine ECU 240 manages the operation of an engine of the vehicle 200. The ABSECU 241 manages an antilock brake system (ABS) of the vehicle 200. The steering ECU 242 manages the steering control of the vehicle 200. The suspension ECU 243 manages the suspension control of the vehicle 200. The air bag ECU 244 manages the operation control of an air bag of the vehicle 200. The automatic driving ECU 245 manages the operation control of automatic driving of the vehicle 200. The keyless entry ECU 246 manages the control of keyless entry of the vehicle 200. The air conditioner control ECU 247 controls an air conditioner of the vehicle 200. The audio ECU 248 controls the operation of audio equipment of the vehicle 200. The pieces of equipment are connected to each other through an in-vehicle network such as a controller area network (CAN). In addition, as illustrated in FIG. 1, the above-described ECUs are connected to different bus-type CAN networks in accordance with the assignment of the functions thereof. The software updating device 210 has a hub function for these bus-type networks.

Meanwhile, an ECU, mounted on the vehicle 200, which is capable of updating software is not limited to the ECU illustrated in FIG. 1. For example, an ECU, such as an ECU for controlling a brake or an ECU for controlling an electronic mirror, which has a function of controlling the vehicle 200 and supporting the safety thereof may be mounted on the vehicle 200 other than the ECUs illustrated in FIG. 1.

Meanwhile, each ECU has built-in software for operating the ECU. The software is stored in a storage device included in each ECU.

The software updating device 210 includes a central processing unit 211 and a storage device 215.

The central processing unit 211 is constituted by, for example, a CPU, a RAM, or the like, and executes a predetermined operation program to perform a process of realizing functions of the software updating device 210. The central processing unit 211 includes an update case confirming unit 212, an update software requesting unit 213, and an ECU software updating unit 214 as the functions thereof.

The update case confirming unit 212 inquires of the telematics center 100 whether or not there is a case for which the updating of software is necessary. In a case where the software update case is present, the update software requesting unit 213 requests update software or an update execution requirement as update data from the telematics center. The ECU software updating unit 214 updates software of an ECU on the basis of the received software and update execution requirement, and transmits an execution result thereof to the telematics center 100.

The storage device 215 is constituted by, for example, an HDD, an SSD, a flash memory, a ROM, or the like, and stores a program executed by the central processing unit 211, a data group necessary for the execution of the program, and the like. Further, the storage device 215 also stores update software distributed from the telematics center 100, the above-described recovery software distributed from the telematics center 100 in a case where the updating of software for any ECU has not been successful, and the like.

The communication unit 220 is constituted by a network card or the like based on a communication standard used in the network 300. The network card is based on wireless communication such as a wireless LAN. The communication unit 220 transmits and receives data to and from the telematics center 100 through the network 300 on the basis of various protocols. Here, communication of the communication unit 220 is limited to a wireless system. For this reason, for example, in a case where the communication unit 220 uses a mobile phone network, the communication unit 220 is outside a communication area for the reason such as the vehicle 200 being parked in an underground parking lot, and thus there is a possibility that the communication unit falls into a situation where the communication unit cannot communicate with the telematics center 100.

The navigation terminal 230 includes a central processing unit 231, a storage device 233, and an input and output device 234 constituted by a combination of a touch panel, a keyboard, a mouse, and the like.

The central processing unit 231 is constituted by, for example, a CPU, a RAM, or the like, and executes a predetermined operation program to perform a process of realizing functions of the navigation terminal 230. The central processing unit 231 includes an update information display unit 232 as the function. The update information display unit 232 performs a display based on update information transmitted from the telematics center 100 on the input and output device 234. When an input to the effect that the updating of software is permitted is performed by a user by using the input and output device 234, permission information is acquired and is transmitted to the telematics center 100.

The storage device 233 is constituted by, for example, an HDD, an SSD, a flash memory, a ROM, or the like, and stores a program executed by the central processing unit 231, a data group necessary for the execution of the program, and the like.

Meanwhile, the software updating device 210 and the navigation terminal 230 may be the same device. In addition, the navigation terminal 230 may not be mounted on the vehicle 200, or a portable terminal such as a smart phone may be used as the navigation terminal 230. In this case, it is considered that the communication unit 220 is present on the portable terminal side and the software updating device 210 communicates with the portable terminal by using a connector such as on board diagnostics (OBD).

Figure 2:
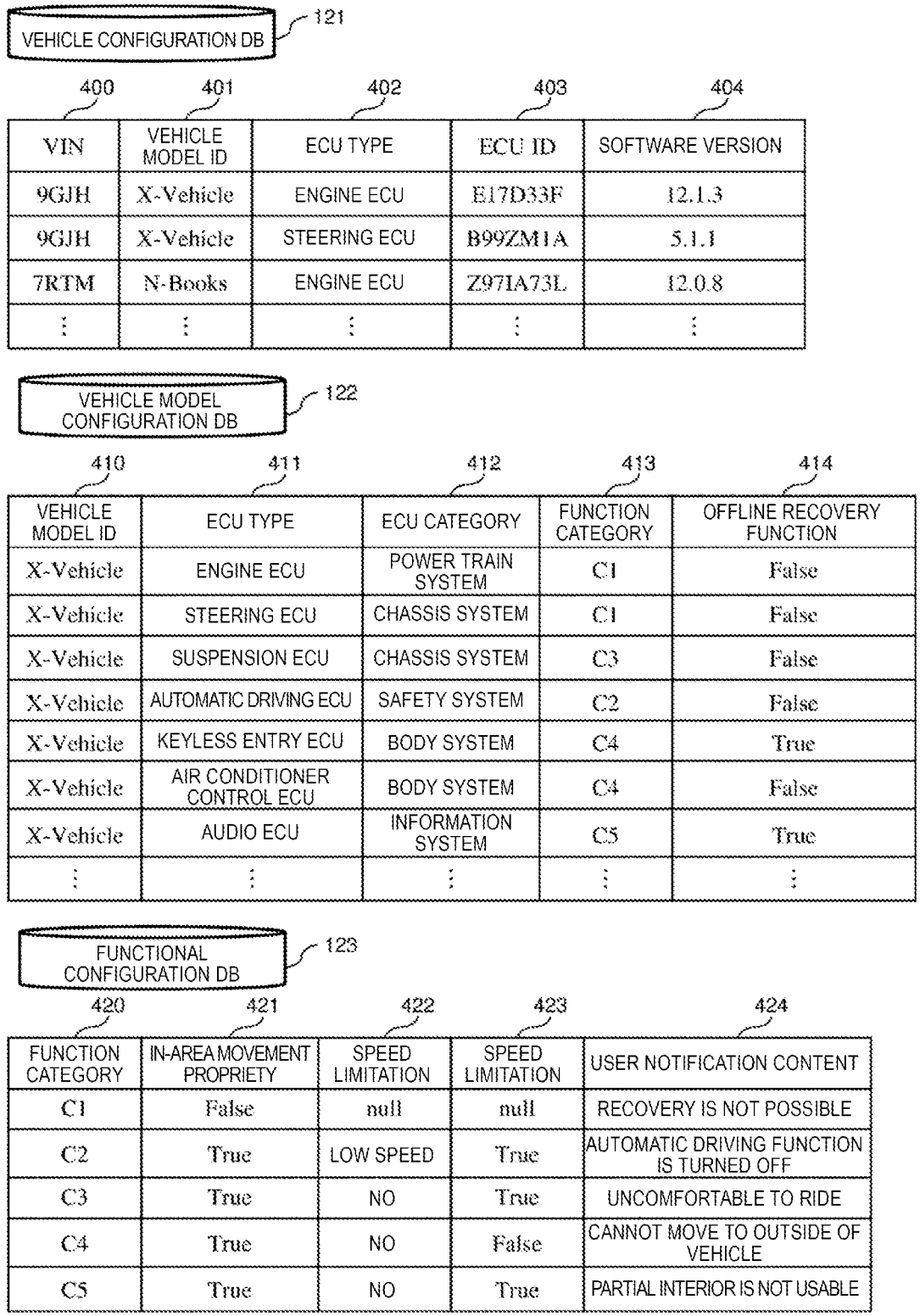
FIG. 2 is a diagram illustrating an example of a table showing the structure of data stored in a DB of a telematics center in the first embodiment of the invention.

FIG. 2 is a diagram illustrating an example of a table showing the structure of data stored in the vehicle configuration DB 121, the vehicle model configuration DB 122, and the functional configuration DB 123 of the telematics center 100 in the first embodiment of the invention.

In the vehicle configuration DB 121, pieces of data of a vehicle identification number (VIN) 400, a vehicle model ID 401, an ECU type 402, an ECU ID 403, and a software version 404 are stored. The VIN 400 is an identifier for uniquely specifying the vehicle 200. The vehicle model ID 401 is an identifier for uniquely specifying a vehicle model of the vehicle 200 including the VIN 400. The ECU type 402 is an identifier for uniquely specifying the type of ECU mounted on the vehicle 200 including the VIN 400. The ECU ID 403 is an identifier for uniquely specifying an ECU mounted on the vehicle 200 including the VIN 400. The software version 404 is an identifier for uniquely specifying version information of software mounted on the ECU specified by the ECU ID 403.

In the vehicle model configuration DB 122, pieces of data of a vehicle model ID 410, an ECU type 411, an ECU category 412, a function category 413, and an offline recovery function 414 are stored. The vehicle model ID 410 is data which is common to the vehicle model ID 401 of the vehicle configuration DB 121, and is an identifier for uniquely specifying the vehicle model of each vehicle 200. The ECU type 411 is data which is common to the ECU type 402 of the vehicle configuration DB 121, and is an identifier for uniquely specifying the type of ECU mounted on each vehicle 200. The ECU category 412 is information indicating a category to which the ECU specified by the ECU type 411 belongs. The function category 413 is information indicating a category of a function performed by the ECU in controlling the vehicle 200. The offline recovery function 414 is information indicating whether or not the ECU supports a recovery method off-line.

Meanwhile, in the vehicle model configuration DB 122, the ECU category 412 reflects a network configuration of each ECU in the vehicle 200 in the software update system illustrated in FIG. 1. That is, the ECUs mounted on the vehicle 200 are connected to different bus-type CAN networks in accordance with the assignment of the functions thereof, as described, and the software updating device 210 has a hub function thereof. The categories of the respective ECUs shown by the ECU category 412 are configured in units of bus-type CAN networks. In a general vehicle, connection between ECUs has such a network configuration, and a name of a power train system, a chassis system, or a safety system is given to each network. The ECU category 412 shows the ECUs mounted on the vehicle 200 being which are divided into a plurality of groups, in accordance with the network configurations.

In addition, in the vehicle model configuration DB 122, the function category 413 shows the degree of importance of the function performed by each ECU, that is, shows what degree of influence the function of each ECU exerts on the operation of the vehicle 200. For example, when the engine ECU 240 does not operate, it is not possible to start the vehicle 200. However, even when the air conditioner control ECU 247 does not operate, the vehicle 200 can travel as usual, and the operation of the vehicle 200 is not directly influenced. The function category 413, showing a difference in function between the ECUs for the control of the vehicle 200, does not necessarily conform to the ECU category 412 and shows the ECUs mounted on the vehicle 200 which are divided into a plurality of groups.

Meanwhile, a division method for the ECU category 412 and the function category 413 is not limited to division into five groups as illustrated in FIG. 2, and may be division into less than or more than five groups.

In the functional configuration DB 123, pieces of data of a function category 420, in-area movement propriety 421, a speed limitation 422, a function limitation 423, and a user notification content 424 are stored. The function category 420 is data which is common to the function category 413 of the vehicle model configuration DB 122, and shows the degree of importance of a function performed by each ECU. The in-area movement propriety 421 is information indicating whether or not the vehicle 200 can be moved in a case where an ECU belonging to a category specified by the function category 420 is set to be in an inoperable state. The speed limitation 422 is information indicating whether or not a speed limitation has to be imposed to the movement of the vehicle 200 when the ECU is set to be in an inoperable state. The function limitation 423 is information indicating whether or not a function limitation has to be imposed to the vehicle 200 when the ECU is set to be in an inoperable state. The user notification content 424 is information indicating a message in a case where a user receives a special notification when the ECU is set to be in an inoperable state.

In the storage device 120, the above-described information is stored in the vehicle configuration DB 121, the vehicle model configuration DB 122, and the functional configuration DB 123 with respect to each vehicle 200. These pieces of information are used to specify an ECU which is a target for the distribution of update software in the configuration information management unit 111. In addition, as described above, the information indicates influence on the operation of the vehicle 200 in a case where the updating of software for any ECU has not been successful.

Figure 3:
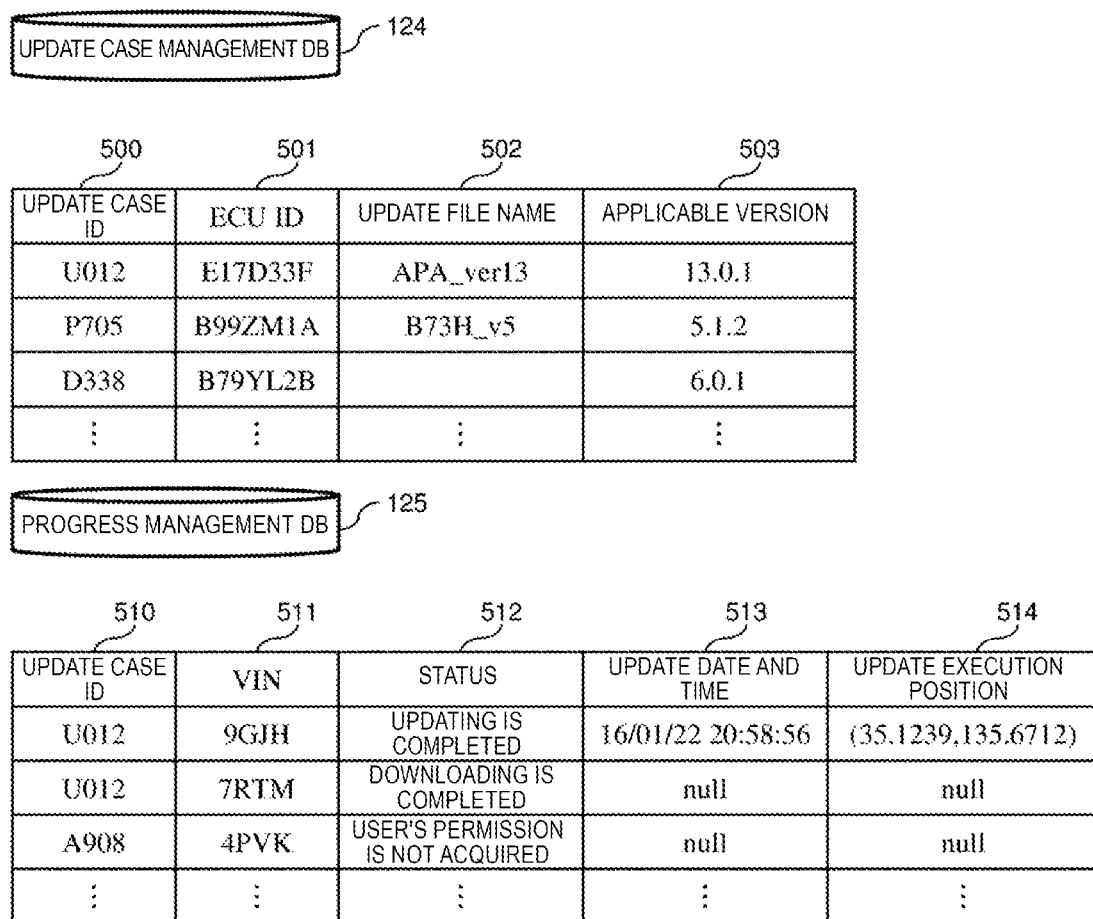
FIG. 3 is a diagram illustrating an example of a table showing the structure of data stored in a DB of a telematics center in the first embodiment of the invention.

FIG. 3 is a diagram illustrating an example of a table showing the structure of data stored in the update case management DB 124 and the progress management DB 125 of the telematics center 100 in the first embodiment of the invention.

In the update case management DB 124, pieces of data of an update case ID 500, an ECU ID 501, an update file name 502, and an applicable version 503 are stored. The update case ID 500 is an identifier for uniquely specifying a case, such as recall, which requires the updating of software targeted at the plurality of vehicles 200. The ECU ID 501 is an identifier for an update case specified by the update case ID 500 to uniquely specify an ECU to be updated, and corresponds to the ECU ID 403 of the vehicle configuration DB 121. The file name 502 is information indicating a file name of update software to be distributed to an ECU to be updated which is specified by the ECU ID 501. The applicable version 503 is information indicating software version of an updated ECU by applying the update software indicated by the file name 502.

In the progress management DB 125, pieces of data of an update case ID 510, a VIN 511, a status 512, an update date and time 513, and an update execution position 514 are stored. The update case ID 510 is data which is common to the update case ID 500 of the update case management DB 124. The VIN 511 is an identifier for uniquely specifying the vehicle 200 which is a target for the update case specified by the update case ID 510, and corresponds to the VIN 400 of the vehicle configuration DB 121. The status 512 is information indicating how much the update case specified by the update case ID 510 has progressed in the vehicle 200 specified by the VIN 511. The status 512 manages a progress status of an update case on the basis of a state such as whether or not the downloading of update software has been completed, whether or not the permission of installation has been obtained from a user (whether or not installation is being currently performed), or whether or not installation has been completed. The update date and time 513 is information indicating the date and time when the updating is executed in a case where the updating of the update case has been completed. The update execution position 514 is information indicating positional information of the vehicle 200 when the updating of the update case is executed.

Meanwhile, pieces of data of the update case management DB 124 are input through the input and output device 130 by an administrator of the telematics center 100, or the like before the telematics center 100 distributes update software to the vehicle 200. Examples of the administrator to be considered include an operator of the telematics center 100, a manufacture administrator of an ECU, and the like. The update case management unit 112 newly generates an ID for an update case when receiving an ID of an ECU to be updated, a file and version information of an update software used for updating, and accumulates pieces of data in the update case management DB 124 on the basis of these input information. Thereafter, the update case management unit 112 retrieves the vehicle 200 having the ECU ID 403 with the same value as the value accumulated in the ECU ID 501 of the update case management DB 124 from the vehicle configuration DB 121, and accumulates the corresponding value of the VIN 400 of the vehicle 200 and the value of the update case ID 500 as the VIN 511 and the update case ID 510 in the progress management DB 125.

Figure 4:
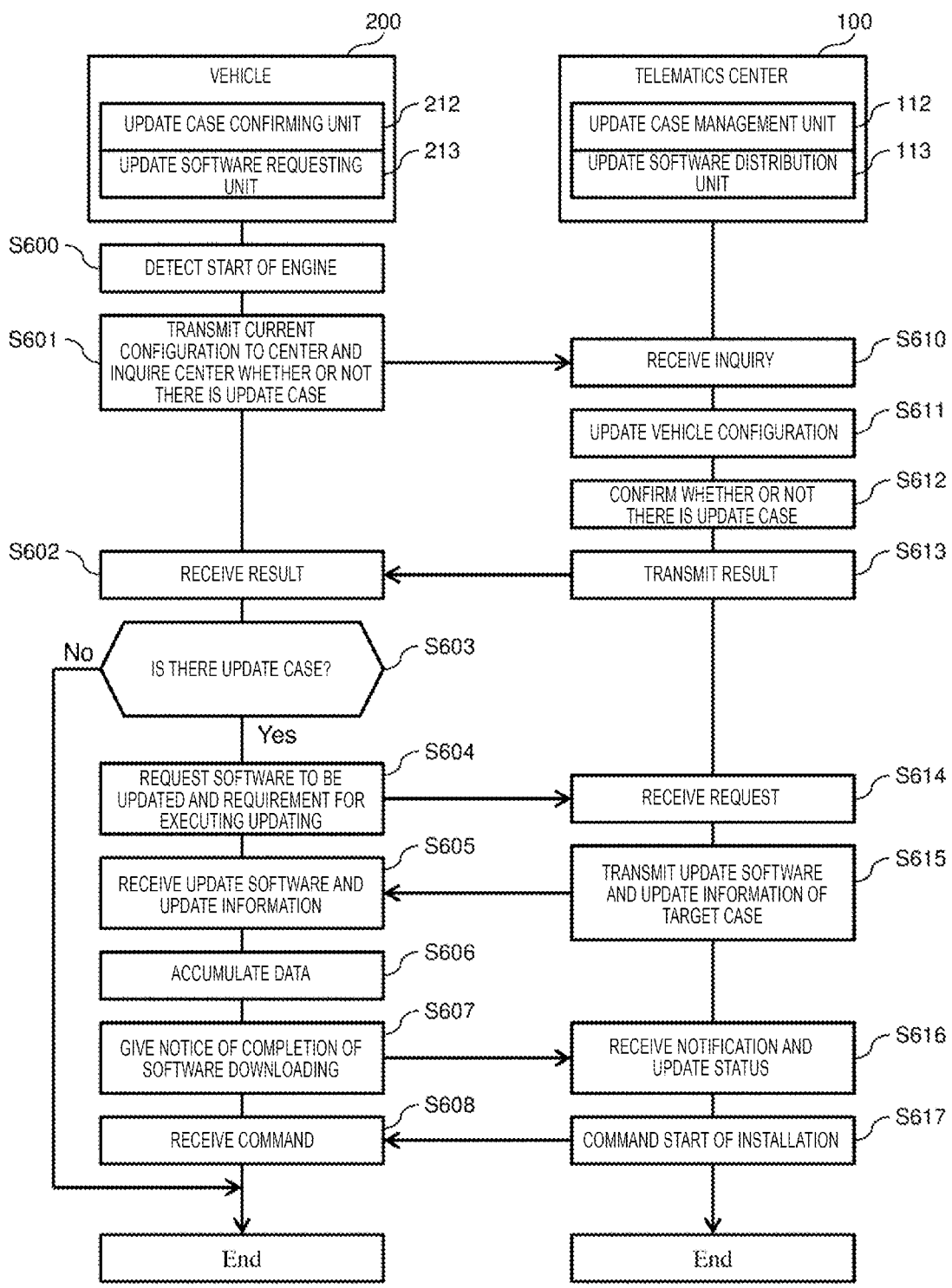
FIG. 4 is a diagram illustrating a flow of a process of downloading update software executed in the first embodiment of the invention.

FIG. 4 is a diagram illustrating a flow of a process of downloading update software executed in the first embodiment of the invention. The processing illustrated in FIG. 4 is performed by the update case confirming unit 212 and the update software requesting unit 213 of the software updating device 210 mounted on the vehicle 200, and the update case management unit 112 and the update software distribution unit 113 of the telematics center 100.

In FIG. 4, the update case confirming unit 212 detects the start of the engine of the vehicle 200 by using information received from the engine ECU 240 (step S600). When the start of the engine is detected in step S600, the update case confirming unit 212 inquires the telematics center 100 of an update case in order to confirm whether or not there is an update case for which updating has not yet been completed (step S601). At this time, the update case confirming unit 212 collects IDs and pieces of information of software versions of all of the ECUs of the vehicle 200 connected to the software updating device 210 from the ECUs. Vehicle configuration information indicating a configuration of the current vehicle 200 is generated on the basis of the collected pieces of information and the VIN of the vehicle 200, is given to an inquiry to the telematics center 100, and is transmitted from the communication unit 220.

The inquiry about the update case which is transmitted from the vehicle 200 in step S601 is received by the communication unit 140 in the telematics center 100 (step S610). When the inquiry about the update case is received in step S610, the update case management unit 112 of the telematics center 100 first updates vehicle configuration information corresponding to the vehicle 200 which is an inquiry source (step S611). Here, the update case management unit 112 retrieves, from the vehicle configuration DB 121, a record having the VIN 400 with the same value as the VIN of the vehicle 200 which is indicated by the vehicle configuration information received together with the inquiry about the update case in step S610. With regard to the ECU ID 403 included in the retrieved record, the value of the software version of the received vehicle configuration information is compared with the value of the software version 404. In a case where the values are different from each other, the value of the software version 404 of the corresponding record is overwritten on the software version of the received vehicle configuration information. At this time, when an ECU is added in the vehicle 200, one record corresponding to the ECU may be added. In addition, in a case where values of software versions of pieces of vehicle configuration information received with respect to all records conform to the value of the software version 404, it is not necessary to execute overwriting processing.

The update case management unit 112 confirms the presence or absence of an update case for the vehicle 200 which is an inquiry source (step S612). Here, the update case management unit 112 confirms whether or not the VIN of the vehicle 200 indicated by the vehicle configuration information received together with the inquiry about the update case in step S610 is registered in the VIN 511 of the progress management DB 125, to thereby confirm the presence or absence of an update case for the vehicle 200. When the presence or absence of an update case can be confirmed in step S612, the update case management unit 112 transmits a confirmation result to the vehicle 200 which is an inquiry source from the communication unit 140 (step S613).

The confirmation result for the update case which is transmitted from the telematics center 100 in step S613 is received by the communication unit 220 in the software updating device 210 of the vehicle 200 (step S602). When the confirmation result for the update case is received in step S602, the update case confirming unit 212 of the software updating device 210 determines the presence or absence of an update case on the basis of the confirmation result (step S603). As a result, in a case where it is determined that an update case is not present (S603: No), it is determined that update software to be downloaded with regard to the present start of the engine, and the processing of FIG. 4 is terminated.

On the other hand, in a case where it is determined that an update case is present (S603: Yes), the update software requesting unit 213 requests the telematics center 100 of update software for an ECU to be updated (step S604).

The request for update software which is transmitted from the vehicle 200 in step S604 is received by the communication unit 140 in the telematics center 100 (step S614). When the request for update software is received in step S614, the update software distribution unit 113 of the telematics center 100 transmits update software of the update case which is a target and update information based on an ECU configuration of the vehicle 200 to the vehicle 200 which is a request source from the communication unit 140 (step S615). Here, the update software distribution unit 113 confirms again whether or not the VIN of the vehicle 200 which is a request source is registered in the VIN 511 of the progress management DB 125 similar to step S612, and retrieves a record, having the same value as the value of the update case ID 510 of the corresponding record recorded in the update case ID 500, from the update case management DB 124, to thereby extract the update file name 502 indicating a file name of update software necessary for the updating of software. Further, a record having the VIN 400 with the same value as that of the VIN of the vehicle 200 which is a request source is retrieved from the vehicle configuration DB 121, a record, having the same value as that of the vehicle model ID 401 of the corresponding record recorded in the vehicle model ID 410, is retrieved from the vehicle model configuration DB 122, and a record, having the same value as that of the function category 413 of the corresponding record of the vehicle model configuration DB 122 stored in the function category 420, is retrieved from the functional configuration DB 123. Pieces of data of the records retrieved in the vehicle model configuration DB 122 and the functional configuration DB 123 are extracted to extract vehicle model configuration information and functional configuration information which correspond to the vehicle 200 which is a request source, and these pieces of information are put together to thereby generate update information based on the ECU configuration of the vehicle 200. This update information indicates influence on the operation of the vehicle 200 in a case where the updating of software for each ECU mounted on the vehicle 200 which is a request source has not been successful. When the file name of the update software is extracted and the update information based on the ECU configuration of the vehicle 200 can be generated, the update software distribution unit 113 extracts update software corresponding to the extracted file name from the update case management DB 124 and transmits the extracted update software to the vehicle 200 which is a request source together with the generated update information.

Meanwhile, in step S614, the update software distribution unit 113 may transmit only the update software to the vehicle 200 and may not transmit the update information. In this case, the update information based on the ECU configuration of the vehicle 200 may be previously stored in the storage device 215 of the software updating device 210 in the vehicle 200. Apart from the processing illustrated in FIG. 4, the update information may be transmitted to the software updating device 210 from the telematics center 100 on a regular basis or as necessary.

The update software and the update information which are transmitted from the telematics center 100 in step S615 are received by the communication unit 220 in the software updating device 210 of the vehicle 200 (step S605). When the update software and the update information are received in step S605, the update software requesting unit 213 of the software updating device 210 accumulates these pieces of data in the storage device 215 (step S606). Thereafter, the update software requesting unit 213 notifies the telematics center 100 that the downloading of the update software has been completed (step S607).

When the notification indicating the completion of downloading which is transmitted from the vehicle 200 in step S607 is received, the update case management unit 112 of the telematics center 100 retrieves a record, having the VIN of the vehicle 200 being a notification source registered therein, from the progress management DB 125, and updates the status 512 of the record (step S616). An instruction for starting installation is transmitted to the vehicle 200 which is a notification source (step S617).

The instruction for starting installation which is transmitted from the telematics center 100 in step S617 is received by the communication unit 220 in the software updating device 210 of the vehicle 200 (step S608). When the instruction for starting installation is received in step S608, the update case confirming unit 212 of the software updating device 210 terminates the processing of FIG. 4 and enters a standby state until the engine of the vehicle 200 is set to be in an off state.

By the above-described processing of FIG. 4, update software for updating software of an ECU to be updated and update information regarding influence on the operation of the vehicle 200 in a case where the updating of the software of the ECU has not been successful are distributed to the software updating device 210 of the vehicle 200 from the telematics center 100.

Figure 5:
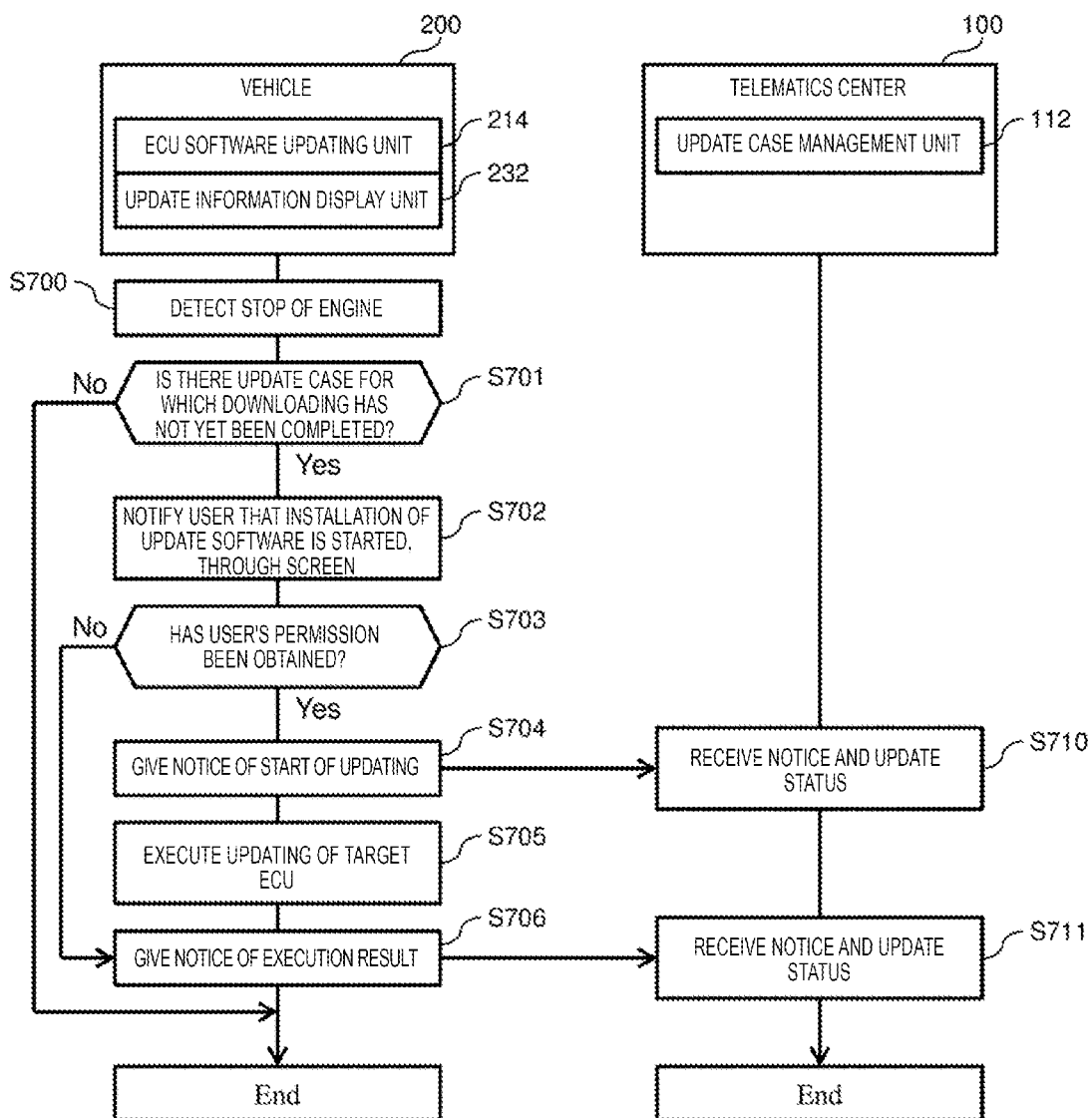
FIG. 5 is a diagram illustrating a flow of ECU software update processing executed in the first embodiment of the invention.

FIG. 5 is a diagram illustrating a flow of ECU software update processing executed in the first embodiment of the invention. The processing illustrated in FIG. 5 is performed by the ECU software updating unit 214 of the software updating device 210 mounted on the vehicle 200, the update information display unit 232 of the navigation terminal 230, and the update case management unit 112 of the telematics center 100.

In FIG. 5, the ECU software updating unit 214 detects the stop of the engine of the vehicle 200 by using information received from the engine ECU 240 (step S700). When the stop of the engine is detected in step S700, the ECU software updating unit 214 confirms whether or not there is an update case for which updating has not yet been completed among update cases for which the downloading of update software has not yet been completed by the processing of FIG. 4 (step S701). As a result, in a case where it is determined that there is no update case for which updating has not yet been completed (S701: No), ECU software update processing to be executed is not present in the present stop state of the engine, and thus the processing of FIG. 5 is terminated.

On the other hand, in a case where it is determined that there is an update case for which updating has not yet been completed (S701: Yes), the update information display unit 232 notifies a user that the installation of update software is started, by using the input and output device 234 (step S702). Here, the update information display unit 232 confirms update contents with reference to the update software which is downloaded from the telematics center 100 in step S605 of FIG. 4 and is stored in the storage device 215. The confirmed update contents are output to the input and output device 234 of the navigation terminal 230 and are displayed on the screen thereof, the user is notified of updating. Further, at this time, choices regarding whether to permit updating are displayed together on the screen, and the user is caused to select any choice in the input and output device 234.

When the user is notified of updating in step S702, the ECU software updating unit 214 determines whether or not permission to perform updating has been obtained on the basis of the user's input operation performed on the input and output device 234 (step S703). As a result, in a case where the permission to perform updating has not been obtained from the user (S703: No), the ECU software updating unit 214 notifies the telematics center 100 that the permission has not been obtained (step S706), and enters a standby state until the engine of the vehicle 200 is set to be in an off state. When this notification is received from the vehicle 200, the update case management unit 112 of the telematics center 100 retrieves a record, having the VIN of the vehicle 200 being a notification source registered therein, from the progress management DB 125, and updates the status 512 of the corresponding record to "user permission acquisition waiting" (step S711). Thereafter, the processing of FIG. 5 is repeated until permission to perform updating is obtained from the user.

On the other hand, in a case where the permission to perform updating is obtained from the user (S703: Yes), the ECU software updating unit 214 notifies the telematics center 100 to start updating EUC software using a file for updating which has been downloaded (step S704). When this notice of the start of updating is received, the update case management unit 112 of the telematics center 100 retrieves the record, having the VIN of the vehicle 200 being a notification source registered therein, from the progress management DB 125, and updates the status 512 of the corresponding record to "update start" (step S710).

When the notice of the start of updating is performed in step S704, the ECU software updating unit 214 executes the updating of ECU software to be updated by using the update software which is downloaded from the telematics center 100 in the process of downloading update software which is described in FIG. 4 and is stored in the storage device 215 (step S705). The ECU software updating unit notifies the telematics center 100 of an update execution result (step S706), and then enters a standby state until the engine of the vehicle 200 is set to be in an off state. When this notification is received from the vehicle 200, the update case management unit 112 of the telematics center 100 retrieves the record, having the VIN of the vehicle 200 being a notification source registered therein, from the progress management DB 125, and updates the status 512 of the corresponding record (step S711). At this time, in a case where a notification indicating that the update execution result is normal is received, the status 512 of the corresponding record is updated to "normal completion of updating", or the status 512 of the corresponding record is updated to "failure in updating".

By the above-described processing of FIG. 5, the ECU software to be updated is updated by using the downloaded update software.

Meanwhile, the communication unit 220 may be outside a communication area as described above and the software updating device 210 and the telematics center 100 may be set to be in an incommunicable state depending on the state of the vehicle 200. In this case, the telematics center 100 cannot receive the notice of the start of updating in step S704 and the notice of the update execution result in step S706 from the software updating device 210. As a result, the update case management unit 112 of the telematics center 100 cannot execute the processes of step S710 and step S711. Therefore, in a case where a notification from the software updating device 210 is not obtained, the update case management unit 112 may reserve the processes of step S710 and step S711 until the vehicle 200 is set to be in a communicable state, and may execute the processes when the vehicle is set to be in a communicable state.

Figure 6:
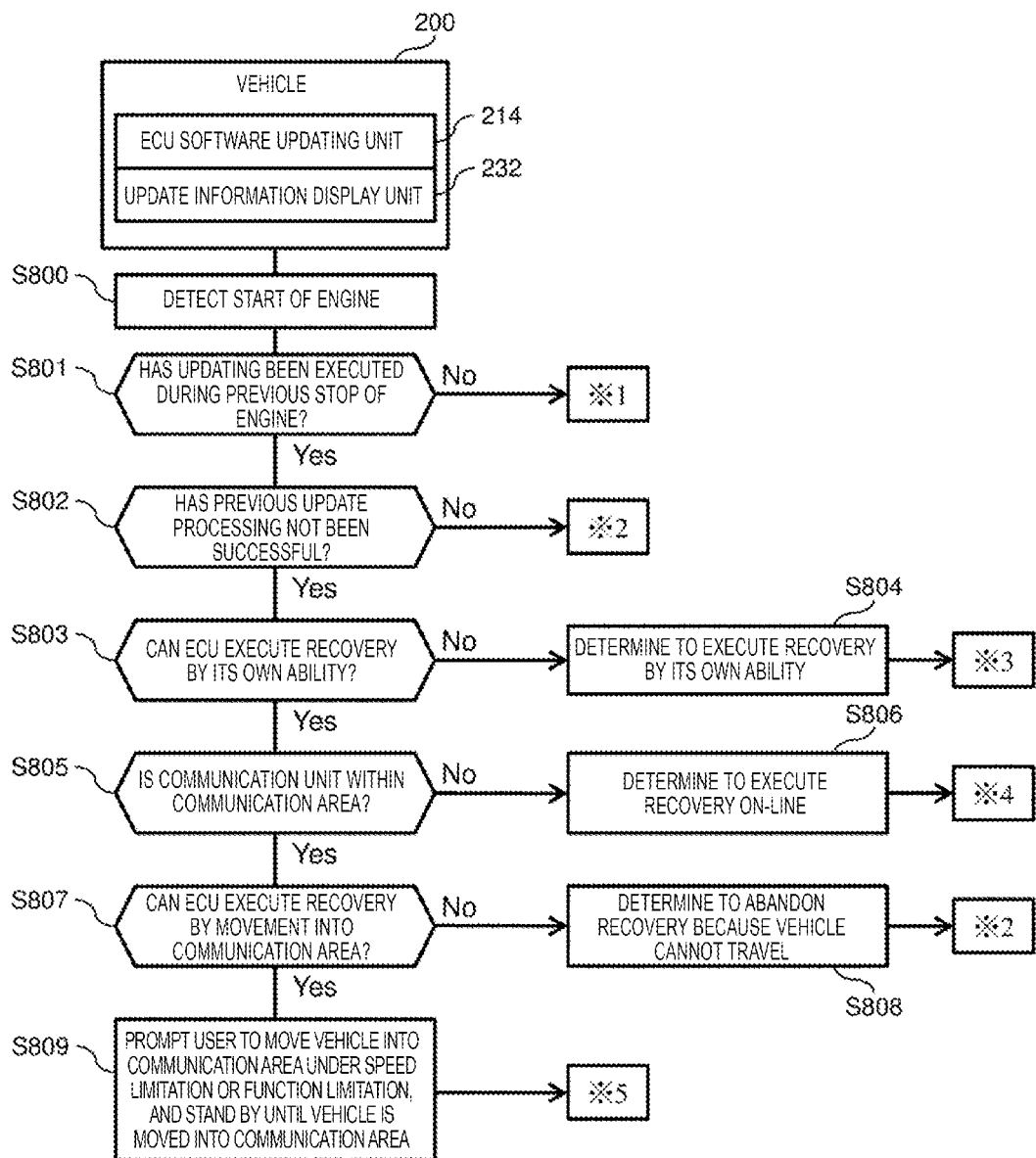
FIG. 6 is a diagram illustrating a flow of recovery processing executed in the first embodiment of the invention.
Figure 7:
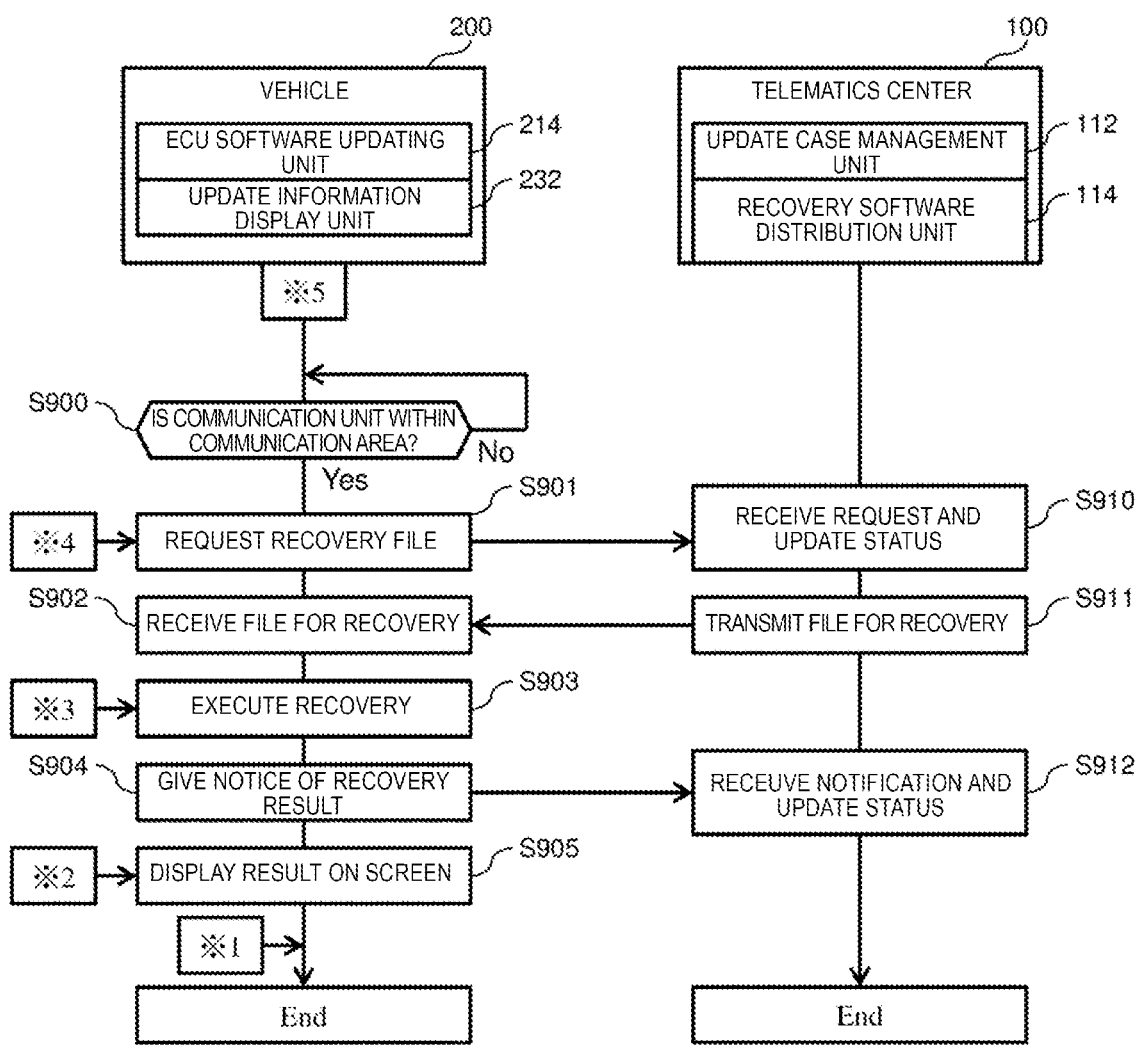
FIG. 7 is a diagram illustrating a flow of recovery processing executed in the first embodiment of the invention.

Next, recovery processing executed in a case where the updating of ECU software has not been successful in the vehicle 200 will be described. FIGS. 6 and 7 are diagrams illustrating a flow of recovery processing executed in the first embodiment of the invention. The processing illustrated in each of FIGS. 6 and 7 is performed by the ECU software updating unit 214 of the software updating device 210 mounted on the vehicle 200, the update information display unit 232 of the navigation terminal 230, and the update case management unit 112 and the recovery software distribution unit 114 of the telematics center 100.

In FIG. 6, the ECU software updating unit 214 detects the start of the engine of the vehicle 200 by using information received from the engine ECU 240 (step S800). When the start of the engine is detected in step S800, the ECU software updating unit 214 confirms whether or not the ECU software update processing described in FIG. 5 has been executed during the previous (last) stop of the engine of the vehicle 200 (step S801). As a result, in a case where the ECU software update processing has not been executed (S801: No), the processing of FIG. 6 and the processing of FIG. 7 are terminated. Meanwhile, the processing illustrated in FIG. 4 may be per formed thereafter.

On the other hand, in a case where the ECU software update processing has been executed (S801: Yes), the ECU software updating unit 214 confirms whether or not a processing result has not been successful (step S802). As a result, the previous ECU software update processing has not been successful (S802: Yes), that is, in a case where the ECU software to be updated has not been normally updated during the last stop of the engine, the processing proceeds to step S803. On the other hand, in a case where the previous ECU software update processing has been successful (S802: No), that is, in a case where the ECU software to be updated has been normally updated during the last stop of the engine, the processing proceeds to step S905 of FIG. 7.

In step S803, the ECU software updating unit 214 determines whether an ECU having failed in the updating of software cannot execute recovery by its own ability. Here, the ECU software updating unit 214 performs the determination in step S803 on the basis of the update information which is downloaded from the telematics center 100 in step S605 of FIG. 4 and is stored in the storage device 215. Specifically, the offline recovery function 414 corresponding to the ECU is retrieved from the vehicle model configuration information included in the update information by using an ECU type of the ECU as a retrieval key, and the content thereof is confirmed, whereby it is determined whether or not the ECU cannot execute recovery by its own ability. As a result, in a case where the content of the offline recovery function 414 corresponding to the ECU is "True", it is determined that the ECU can execute recovery by its own ability (step S803: No), and the processing proceeds to step S804. On the other hand, in a case where the content of the offline recovery function 414 corresponding to the ECU is "False", it is determined that the ECU cannot execute recovery by its own ability (step S803: Yes), and the processing proceeds to step S805.

In step S804, the ECU software updating unit 214 determines that the ECU executes recovery by its own ability. After this determination, the ECU software updating unit 214 advances the processing to step S903 of FIG. 7.

In step S805, the ECU software updating unit 214 determines whether or not the communication unit 220 mounted on the vehicle 200 is outside a communication area, that is, whether or not the software updating device 210 and the telematics center 100 are set to be in a communicable state. As a result, in a case where the communication unit 220 is within the communication area and the software updating device 210 and the telematics center 100 can communicate with each other (step S805: No), the processing proceeds to step S806. On the other hand, in a case where the communication unit 220 is outside the communication area and the software updating device 210 and the telematics center 100 cannot communicate with each other (step S805: Yes), the processing proceeds to step S807.

In step S806, the ECU software updating unit 214 determines that the ECU executes recovery on-line. After this determination, the ECU software updating unit 214 advances the processing to step S901 of FIG. 7.

In step S807, the ECU software updating unit 214 moves the vehicle 200 into the communication area to determine whether or not an ECU failing in the updating of software can execute recovery on-line. Here, the ECU software updating unit 214 performs the determination of step S807 on the basis of the update information which is downloaded from the telematics center 100 in step S605 of FIG. 4 and is stored in the storage device 215. Specifically, the function category 413 corresponding to the ECU is retrieved from the vehicle model configuration information included in the update information by using an ECU type of the ECU as a retrieval key, and the content thereof is confirmed, whereby a function category to which the ECU belongs is specified. The in-area movement propriety 421 corresponding to the ECU is retrieved from the functional configuration information included in the update information by using the specified function category as a retrieval key, and the content thereof is confirmed, whereby it is determined whether or not the vehicle 200 can be moved into the communication area without using the ECU. As a result, in a case where the content of the in-area movement propriety 421 corresponding to the ECU is "False", it is determined that the vehicle 200 cannot be moved into the communication area without using the ECU (step S807: No), and the processing proceeds to step S808. On the other hand, in a case where the content of the in-area movement propriety 421 corresponding to the ECU is "True", it is determined that the vehicle 200 can be moved into the communication area without using the ECU (step S807: Yes), and the processing proceeds to step S809.

In step S808, the ECU software updating unit 214 determines to abandon the recovery of the ECU because the vehicle 200 cannot travel and cannot be moved into the communication area. After this determination, the ECU software updating unit 214 advances the processing to step S905 of FIG. 7.

In step S809, the ECU software updating unit 214 prompts the user to move the vehicle 200 into the communication area. Here, the ECU software updating unit 214 gives a notification to the user by using the update information display unit 232 and the input and output device 234 of the navigation terminal 230. Specifically, the software updating device 210 outputs a message to the effect that the vehicle 200 has to be moved to a position where the vehicle can communicate with the telematics center 100 by the display of an image or a sound by the input and output device 234 according to the control of the update information display unit 232, and thus the user is prompted to move the vehicle 200 into the communication area. Further, at this time, the ECU software updating unit 214 determines whether or not there is a limitation on the operation of the vehicle 200 which is moving on the basis of the update information which is downloaded from the telematics center 100 in step S605 of FIG. 4 and is stored in the storage device 215, and notifies the user of the content thereof in a case where it is determined that there is a limitation. Specifically, the speed limitation 422, the function limitation 423, and the user notification content 424 which correspond to the ECU are retrieved from the functional configuration information included in the update information by using the function category specified in step S807 as a retrieval key. The presence or absence of a speed limitation or a function limitation with respect to the operation of the vehicle 200 which is moving is confirmed and the content of a notification given to the user is confirmed on the basis of the retrieved data contents, and a notification is given to the user by the display of an image or a sound by the input and output device 234 according to the control of the update information display unit 232. When these notifications are given, the ECU software updating unit 214 stands by until the vehicle 200 is moved into the communication area, and the processing proceeds to step S900 of FIG. 7.

In step S900 of FIG. 7, the ECU software updating unit 214 periodically confirms whether or not the communication unit 220 mounted on the vehicle 200 is within the communication area.

In a case where the communication unit 220 is within the communication area (S900: Yes) or in a case where it is determined that recovery is executed on-line in step S806 of FIG. 6, the ECU software updating unit 214 requests the telematics center 100 of recovery software for recovering software of a target ECU (step S901). When the request is received, the update case management unit 112 of the telematics center 100 retrieves a record, having the VIN of the vehicle 200 being a notification source registered therein, from the progress management DB 125, and updates the status 512 of the corresponding record to "on recovery" (step S910). Data, such as software data before updating, for returning software of the ECU to a state before updating is extracted from the update case management DB 124, and is transmitted to the vehicle 200 as recovery software (step S911).

The recovery software transmitted from the telematics center 100 in step S911 is received by the communication unit 220 in the software updating device 210 of the vehicle 200 (step S902). When the recovery software is received in step S902, the ECU software updating unit 214 of the software updating device 210 executes recovery processing of an ECU failing in the updating of software by using the received recovery software (step S903). The telematics center 100 is notified of a result of the recovery (step S904).

When a notice of the recovery result is given from the software updating device 210 of the vehicle 200, the update case management unit 112 of the telematics center 100 retrieves a record having the VIN of the vehicle 200 being a notification source registered therein, from the progress management DB 125, and updates the status 512 of the corresponding record to "completion of recovery" (step S912).

When a notice of the recovery result is given in step S904, the ECU software updating unit 214 performs the display of a screen in order to notify the user of the recovery result by using the update information display unit 232 and the input and output device 234 of the navigation terminal 230 (step S905). Here, the screen on which the result of the recovery processing executed in step S903 indicates either success or failure is displayed on the input and output device 234. Meanwhile, in a case where the recovery result is not successful, a state where the vehicle 200 cannot move only under a speed limitation or a function limitation continues, which causes a restriction on the operation of the vehicle 200. Therefore, in this case, for example, contact information of a dealer of the nearest vehicle 200 or a route to the dealer may be displayed on the input and output device 234 so that the user can perform basic recovery processing in the dealer. In addition, the process of downloading update software which is described in FIG. 4 is executed after the recovery processing illustrated in FIGS. 6 and 7 is terminated, and thus vehicle configuration information is transmitted to the telematics center 100 to perform the confirmation of an update case.

Meanwhile, in a case where it is determined that the recovery is abandoned in step S808 of FIG. 6, the ECU software updating unit 214 performs the display of a screen for notifying the user that the recovery has been abandoned in step S905. In this case, the vehicle 200 cannot travel, and a state where the user cannot use the vehicle 200 continues, and thus, for example, contact information of a dealer of the nearest vehicle 200 may be displayed on the input and output device 234 so that the user makes contact with the dealer to be able to perform basic recovery processing.

Meanwhile, in a case where it is determined in step S804 of FIG. 6 that the recovery is executed off-line by the ECU's own ability, the ECU software updating unit 214 executes the recovery processing in step S903 off-line without using a file for recovery in step S903. In a case where the recovery processing is not successful, the processing returns to step S805 of FIG. 6 to confirm whether or not the communication unit 220 is outside the communication area. Thus, it is confirmed whether or not the recovery can be executed on-line, and the process of step S806 and the subsequent processes may be executed in a case where the recovery can be executed.

In addition, in step S900 of FIG. 7, in a case where the communication unit 220 is not within the communication area in spite of the elapse of a fixed period of time, the ECU software updating unit 214 may terminate the processing illustrated in FIGS. 6 and 7. In this case, for example, contact information of a dealer of the nearest vehicle 200 or a route to the dealer may be displayed on the input and output device 234 so that the user can perform basic recovery processing in the dealer before the processing terminated, similar to a case where the above-described recovery result is not successful.

By the above-described processing of FIGS. 6 and 7, in a case where the updating of ECU software is not successful in the vehicle 200, the contents of the recovery processing are determined on the basis of the update information which is downloaded from the telematics center 100 and is stored in the storage device 215. Thereby, the operation of the ECU software updating unit 214 in the recovery processing is controlled.

Figure 8:
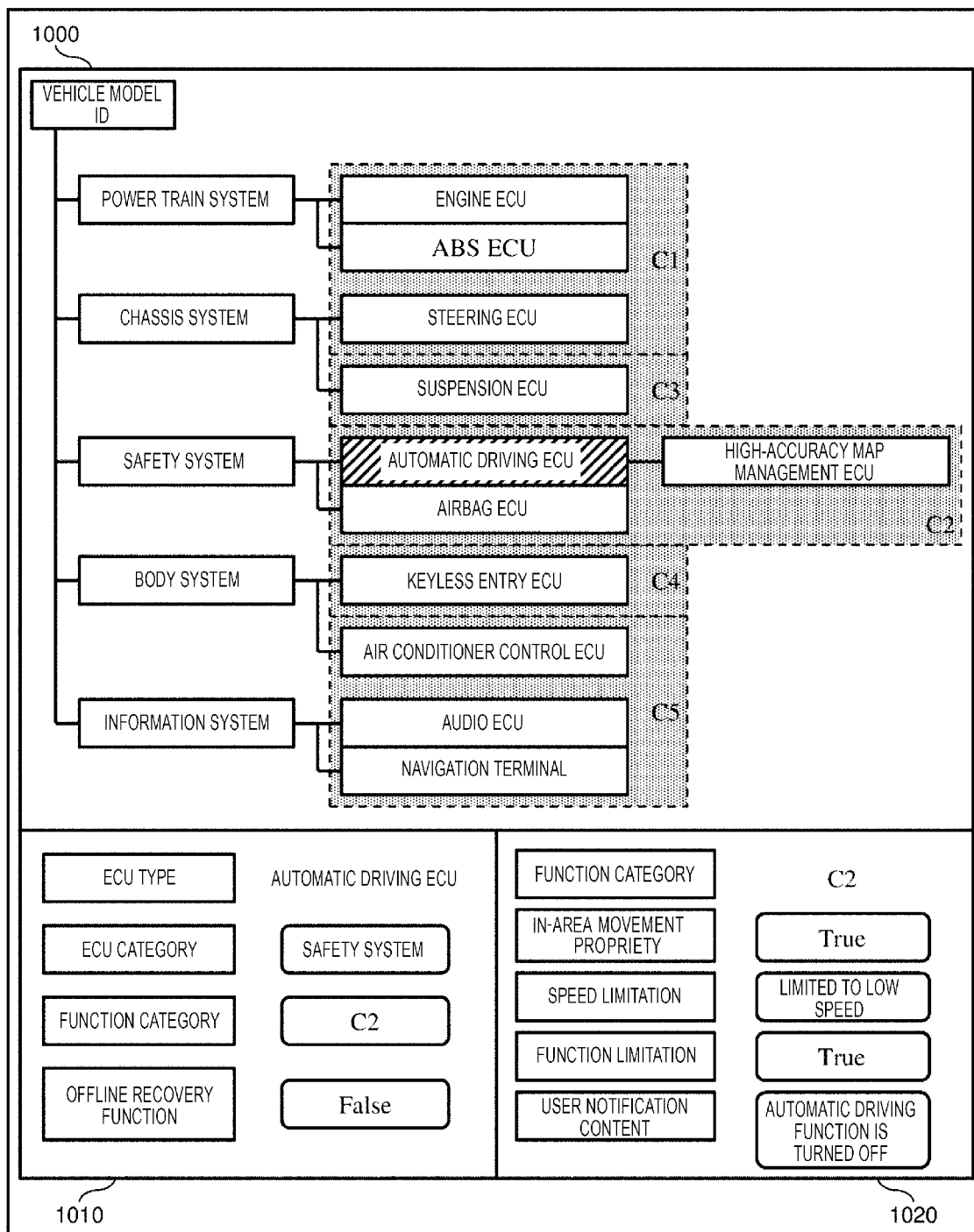
FIG. 8 is a diagram illustrating an example of a screen displayed on an input and output device of a telematics center in the first embodiment of the invention.

FIG. 8 is a diagram illustrating an example of a screen displayed on the input and output device 130 of the telematics center 100 in the first embodiment of the invention. For example, the screen as illustrated in FIG. 8 is displayed on the input and output device 130, as a screen indicating a function category to which each of the plurality of ECUs mounted on the vehicle 200 belongs.

The screen of FIG. 8 is constituted by screen regions respectively denoted by reference numerals 1000, 1010, and 1020. The screen region 1000 shows visualized information of the vehicle model configuration DB 122. In the screen region 1000, types and categories of all of the ECUs mounted on the vehicle 200 are shown in units of vehicle models by using a tree-shaped figure on the basis of the pieces of information of the vehicle model ID 410, the ECU type 411, and the ECU category 412 in the vehicle model configuration DB 122. The screen regions 1010 and 1020 show visualized information recorded in the vehicle model configuration DB 122 and the functional configuration DB 123 with respect to any ECU (the automatic driving ECU 245 in the example of FIG. 8) which is selected in the screen region 1000. The screen region 1010 shows contents of pieces of information of the ECU type 411, the ECU category 412, the function category 413, and the offline recovery function 414 of the vehicle model configuration DB 122 corresponding to the ECU. The screen region 1020 show contents of pieces of information of the function category 420, the in-area movement propriety 421, the speed limitation 422, the function limitation 423, and the user notification content 424 of the functional configuration DB 123 corresponding to the ECU. Meanwhile, in the screen regions 1010 and 1020, the administrator of the telematics center 100 overwrites any information through the input and output device 130, and thus it is possible to change contents of the vehicle model configuration DB 122 or the functional configuration DB 123.

Figure 9:
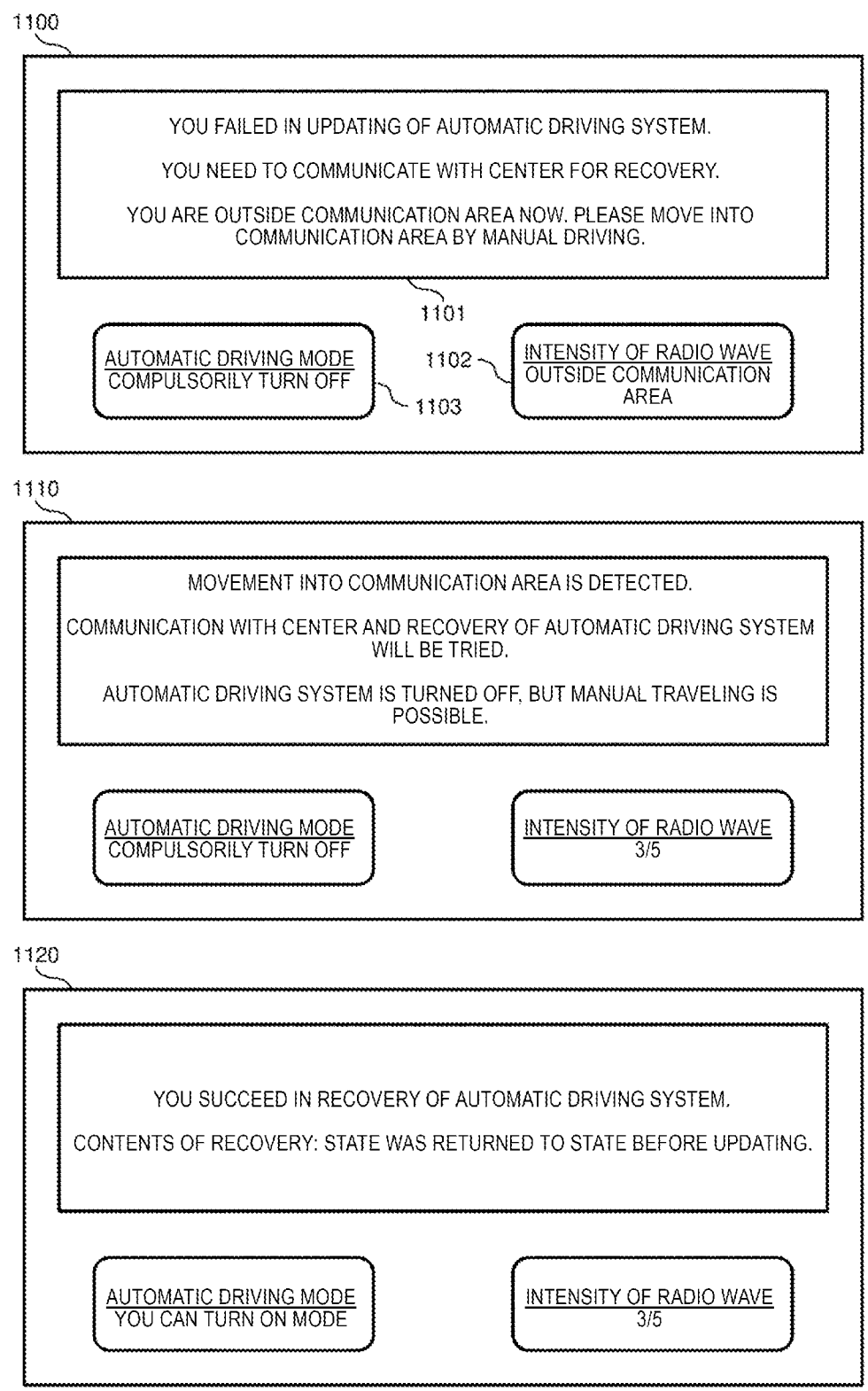
FIG. 9 is a diagram illustrating an example of a screen displayed on an input and output device of a navigation terminal mounted on a vehicle in the first embodiment of the invention.

FIG. 9 is a diagram illustrating an example of a screen displayed on the input and output device 234 of the navigation terminal 230 mounted on the vehicle 200 in the first embodiment of the invention.

In FIG. 9, a screen 1100 is an example of a screen displayed on the input and output device 234 in order to prompt the user to move the vehicle 200 into the communication area in step S809 of FIG. 6. The screen 1100 is constituted by screen regions respectively denoted by reference numerals 1101, 1102, and 1103. The screen region 1101 is a region indicating that the communication unit 220 is currently outside the communication area and it is necessary to move the vehicle 200 into the communication area in order to perform the recovery of ECU software on-line. The screen region 1102 is a region indicating a radio wave condition of the communication unit 220. The screen region 1103 is a region indicating the state of a function limitation of the vehicle 200. The screen 1100 shows a situation where, for example, the automatic driving ECU 245 fails in the updating of software and the vehicle 200 is in an area outside the communication area, by these screen regions. In this case, since the updating of software of the automatic driving ECU 245 is not successful, an automatic driving function is compulsorily turned off in the vehicle 200, but any influence is not exerted on manual driving. For this reason, the screen 1100 is displayed so that the user is prompted to manually move the vehicle 200 into an area within the communication area.

In FIG. 9, a screen 1110 is an example of a screen displayed on the input and output device 234 when the communication unit 220 being within the communication area is detected in step S900 of FIG. 7. In the screen 1110, a message for notifying a user that the recovery of software of the automatic driving ECU 245 is started on-line by communication with the telematics center 100 is displayed.

In FIG. 9, a screen 1120 is an example of a screen displayed on the input and output device 234 in step S905 of FIG. 7 when the recovery of ECU software is successful. In the screen 1120, a message for notifying the user that the recovery of software of the automatic driving ECU 245 is successful is displayed.

Meanwhile, the examples of the screens illustrated in FIG. 9 show an example of a case where the recovery of software of the automatic driving ECU 245 is performed, but the contents of display of the screens may be changed in accordance with an ECU which is a target for recovery.

According to the above-described first embodiment of the invention, the following operational effects are exerted.

(1) The software update system of this embodiment manages the updating of software of an ECU which is in-vehicle equipment mounted on the vehicle 200, and includes the software updating device 210 mounted on the vehicle 200, and the telematics center 100 that communicates with the software updating device 210 through the network 300. The telematics center 100 includes the update software distribution unit 113 that distributes update software for updating software of the ECU to the software updating device 210. The software updating device 210 includes the storage device 215 that stores update software distributed from the telematics center 100 and stores update information regarding influence on the operation of the vehicle 200 in a case where the updating of software of an ECU is not successful and the ECU software updating unit 214 that updates the software of the ECU by using the update software stored in the storage device 215, and controls the operation of the ECU software updating unit 214 on the basis of the update information stored in the storage device 215. In this manner, it is possible to realize the updating of software of in-vehicle equipment based on OTA which is easy for a user to utilize.

(2) The ECU software updating unit 214 of the software updating device 210 determines the contents of recovery processing performed in a case where the updating of software of an ECU is not successful, on the basis of update information (steps S803 to S809). In this manner, it is possible to appropriately determine the contents of the recovery processing.

(3) The telematics center 100 includes the recovery software distribution unit 114 that distributes recovery software for returning software of an ECU to a state before updating to the software updating device 210. In a case where the software updating device 210 can communicate with the telematics center 100 (step S805: No), the ECU software updating unit 214 of the software updating device 210 requests the telematics center 100 to distribute the recovery software in the recovery processing (step S901). On the other hand, in a case where the software updating device 210 cannot communicate with the telematics center 100 (step S805: Yes), it is determined whether or not the vehicle 200 can be moved on the basis of update information in the recovery processing (step S807). As a result, when the vehicle 200 can be moved, the user is prompted to move the vehicle 200 to a position where the software updating device 210 can communicate with the telematics center 100 (step S809). When the software updating device 210 and the telematics center 100 are set to be in a communicable state (step S900: Yes), the telematics center 100 is requested of the distribution of recovery software (step S901). In this manner, even when the software updating device 210 cannot communicate with the telematics center 100 due to the position of the vehicle 200, it is possible to realize the recovery processing on-line by causing the user to move the vehicle 200.

(4) The ECU software updating unit 214 determines whether or not there is a limitation on the operation of the vehicle 200 on the basis of update information at the time of prompting the user to move the vehicle 200 in step S809, and notifies the user of the contents thereof as illustrated in the screen 1100 of FIG. 9 in a case where it is determined that there is a limitation. In this manner, even when there is a limitation on the operation of the vehicle 200 because an ECU being a target for recovery cannot be used, it is possible to cause the user to safely move the vehicle 200.

(5) The update software distribution unit 113 of the telematics center 100 distributes update information and update software to the software updating device 210 (step S615). The storage device 215 of the software updating device 210 stores the update software and update information distributed from the telematics center 100 (step S606). In this manner, it is possible to store the update information based on an ECU configuration of the vehicle 200 in the storage device 215.

(6) The plurality of ECUs mounted on the vehicle 200 are grouped into a plurality of function categories like, for example, function categories C1 to C5 in accordance with the degree of influence on the operation of the vehicle 200. Update information includes information of the function category 413 which is information indicating to which one of the plurality of function categories each of the plurality of ECUs mounted on the vehicle 200 belongs. In this manner, it is possible to intelligibly indicate the degree of influence of each ECU on the operation of the vehicle 200 in the update information.

(7) The telematics center 100 includes the input and output device 130 that displays the screen as illustrated in FIG. 8, as a display device that displays the function categories to which the plurality of ECUs mounted on the vehicle 200 respectively belong on a screen. In this manner, it is possible to intelligibly present functions of the ECUs to the administrator of the telematics center 100.

Second Embodiment

In the first embodiment, a description has been given of an example in which software of an ECU to be updated is updated in a state where the engine of the vehicle 200 is stopped, that is, a state where the vehicle 200 is not used. On the other hand, in a second embodiment, a description will be given of an example in which software of an ECU to be updated is updated even when the vehicle 200 is traveling. Meanwhile, a configuration of a software update system and a process of downloading update software in the second embodiment are the same as those described in FIGS. 1 to 4 in the first embodiment. For this reason, a description thereof will be omitted below.

Figure 10:
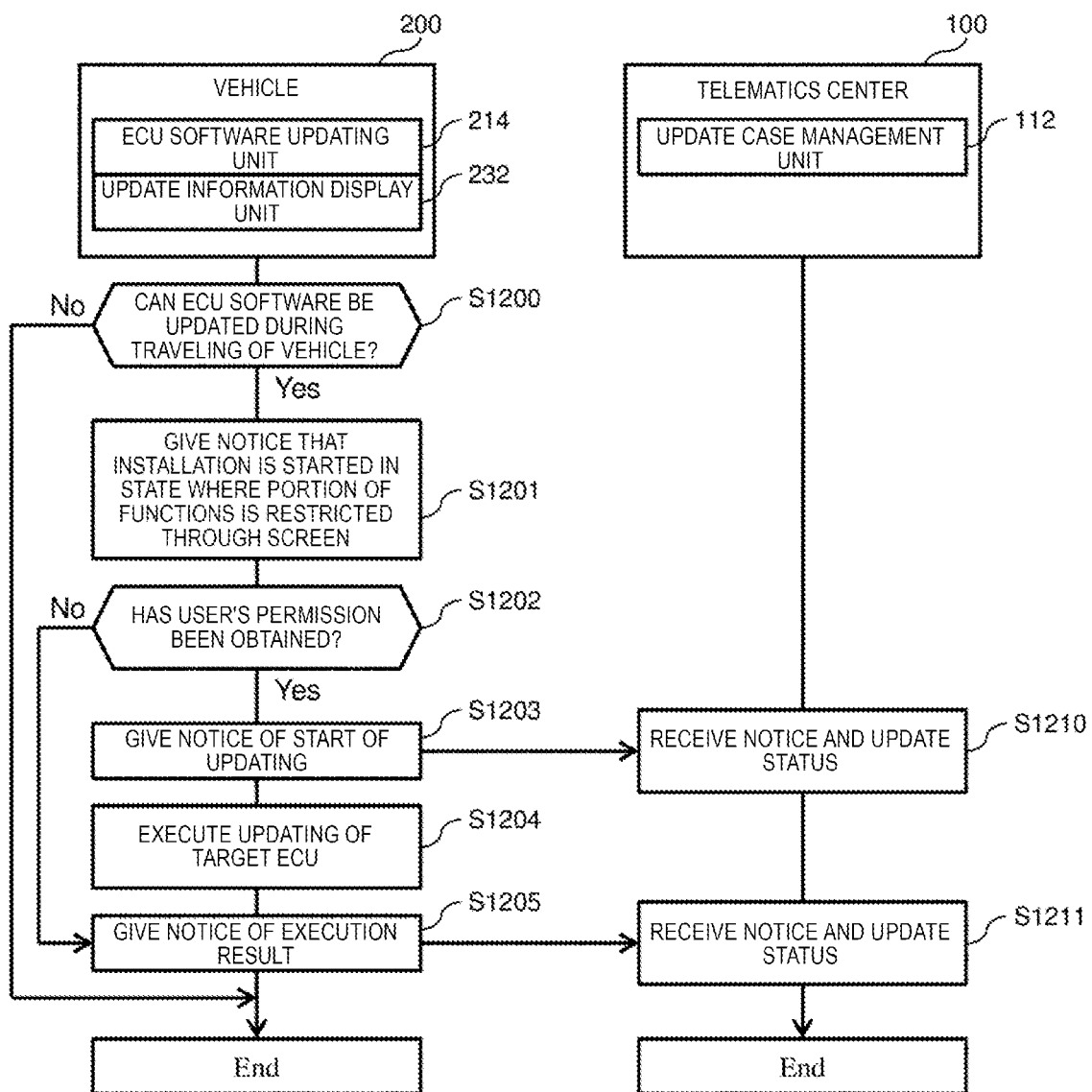
FIG. 10 is a diagram illustrating a flow of ECU software update processing executed in a second embodiment of the invention.

FIG. 10 is a diagram illustrating a flow of ECU software update processing executed in the second embodiment of the invention. The processing illustrated in FIG. 10 is performed by an ECU software updating unit 214 of a software updating device 210 and an update information display unit 232 of a navigation terminal 230 which are mounted on a vehicle 200, and an update case management unit 112 of a telematics center 100. Meanwhile, in this embodiment, the processing of FIG. 10 is executed instead of the processing described in FIG. 5 in the first embodiment.

In FIG. 10, when the ECU software updating unit 214 receives an instruction for starting installation from the telematics center 100, determination in step S1200 is immediately performed without standing by until the engine of the vehicle 200 is stopped. In step S1200, the ECU software updating unit 214 determines whether or not ECU software to be updated can be updated during the traveling of the vehicle 200. This determination can be performed by the same method as that of step S807 of FIG. 6 described in the first embodiment. That is, the content of in-area movement propriety 421 of a function category to which the ECU belongs is confirmed in functional configuration information included in update information, and thus it is determined whether or not the vehicle 200 can be made to travel without using the ECU. As a result, in a case where the content of the in-area movement propriety 421 corresponding to the ECU is "False", it is determined that the vehicle 200 cannot be made to travel without using the ECU (step S1200: No), and the processing of FIG. 10 is terminated. In this case, similarly to the first embodiment, there is an attempt to update software of the ECU after the engine is stopped. On the other hand, in a case where the content of the in-area movement propriety 421 corresponding to the ECU is "True", it is determined that the vehicle 200 can be made to travel without using the ECU (step S1200: Yes), and the processing proceeds to step S1201.

In step S1201, the update information display unit 232 notifies a user that the installation of update software is started by using an input and output device 234. Further, at this time, the update information display unit 232 determines whether or not there is a limitation on the operation of the vehicle 200 which is traveling on the basis of the update information which is stored in a storage device 215 similar to step S809 of FIG. 6 described in the first embodiment, and notifies the user of the content thereof in a case where it is determined that there is a limitation. That is, the presence or absence of a speed limitation or a function limitation with respect to the operation of the vehicle 200 which is traveling is confirmed and the content of a notification given to the user is confirmed on the basis of the contents of a speed limitation 422, a function limitation 423, and a user notification content 424 corresponding to the ECU in the functional configuration information included in the update information, and a notification is given to the user by the display of an image or a sound by the input and output device 234 according to the control of the update information display unit 232. In addition, similarly to step S702 of FIG. 7, choices regarding whether to permit updating are displayed together on the screen, and the user is caused to select any choice in the input and output device 234.

When the user is notified of updating in step S1201, the ECU software updating unit 214 determines whether or not permission to perform updating has been obtained on the basis of the user's input operation performed on the input and output device 234 (step S1202). As a result, in a case where the permission to perform updating has not been obtained from the user (S1202: No), the ECU software updating unit 214 notifies the telematics center 100 that the permission has not been obtained (step S1205), and enters a standby state until the engine of the vehicle 200 is set to be in an off state. When this notification is received from the vehicle 200, the update case management unit 112 of the telematics center 100 retrieves a record, having the VIN of the vehicle 200 being a notification source registered therein, from a progress management DB 125, and updates a status 512 of the record to "user permission acquisition waiting" (step S1211). Thereafter, the processing of FIG. 10 is repeated until permission to perform updating is obtained from the user.

On the other hand, in a case where the permission to perform updating is obtained from the user (S1202: Yes), the ECU software updating unit 214 notifies the telematics center 100 to start updating EUC software using a file for updating which has been downloaded (step S1203). When this notice of the start of updating is received, the update case management unit 112 of the telematics center 100 retrieves the record, having the VIN of the vehicle 200 being a notification source registered therein, from the progress management DB 125, and updates the status 512 of the corresponding record to "update start" (step S1210).

When the notice of the start of updating is performed in step S1203, the ECU software updating unit 214 executes the updating of ECU software to be updated by using the update software which is downloaded from the telematics center 100 and is stored in the storage device 215 (step S1204). At this time, the update processing in step S1204 is executed regardless of whether or not the vehicle 200 is traveling. The telematics center 100 is notified of an update execution result (step S1205). When this notification is received from the vehicle 200, the update case management unit 112 of the telematics center 100 retrieves a record, having the VIN of the vehicle 200 being a notification source registered therein, from the progress management DB 125, and updates the status 512 of the corresponding record (step S1211). At this time, in a case where a notification indicating that the update execution result is normal is received, the status 512 of the corresponding record is updated to "normal completion of updating", or the status 512 of the corresponding record is updated to "failure in updating". Meanwhile, in a case where the updating is not successful, the recovery processing described in FIGS. 6 and 7 in the first embodiment may be executed.

By the above-described processing of FIG. 10, in a case where ECU software to be updated does not have influence on the traveling of the vehicle 200 even when the vehicle 200 is traveling, it is possible to execute the updating of the ECU software by using downloaded update software after obtaining the user's permission.

According to the above-described second embodiment of the invention, the ECU software updating unit 214 of the software updating device 210 determines whether or not the vehicle 200 can move during the updating of software of an ECU on the basis of the update information stored in the storage device 215 (step S1200). As a result, in a case where it is determined that the vehicle 200 can move (step S1200: Yes), the software of the ECU is updated during the traveling of the vehicle 200 (step S1204). In this manner, it is possible to update the software of the ECU during the traveling of the vehicle 200.

Third Embodiment

In the first embodiment, a description has been given of an example in which the presence or absence of an update case is notified without considering a processing load of a telematics center 100 by confirming whether or not a VIN of a vehicle 200 is registered in a VIN 511 of a progress management DB 125 in accordance with an inquiry from the vehicle 200, and notifying the vehicle 200 of a confirmation result. On the other hand, in the third embodiment, a description will be given of an example in which the presence or absence of an update case is notified in consideration of a processing load of the telematics center 100. Meanwhile, a configuration of a software update system in the third embodiment is the same as those described in FIGS. 1 to 3 in the first embodiment. For this reason, a description thereof will be omitted below.

Figure 11:
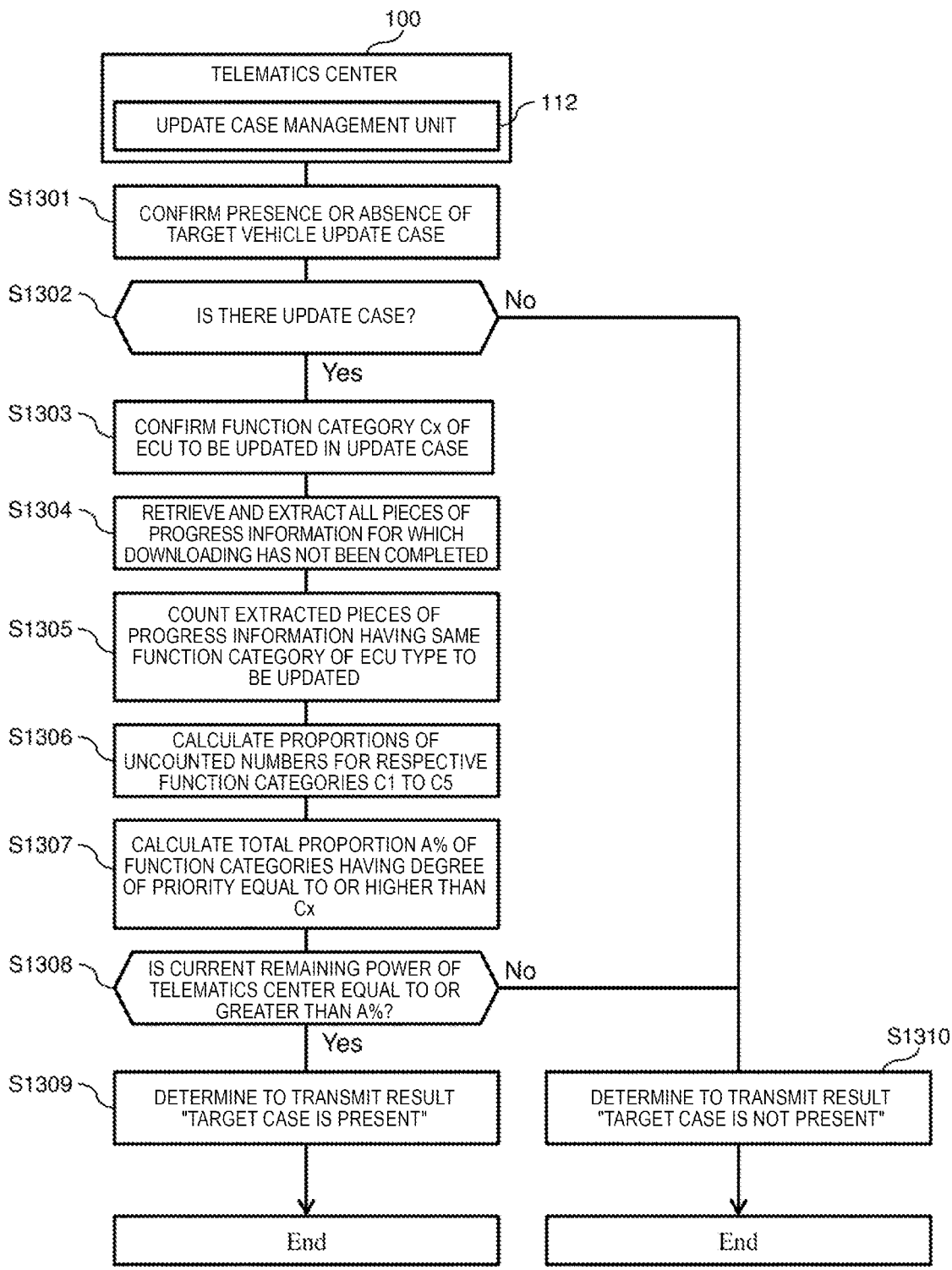
FIG. 11 is a diagram illustrating a flow of update case confirmation processing executed in a third embodiment of the invention.

FIG. 11 is a diagram illustrating a flow of update case confirmation processing executed in the third embodiment of the invention. The processing illustrated in FIG. 11 is performed by an update case management unit 112 of a telematics center 100. Meanwhile, in this embodiment, the processing of FIG. 11 is executed instead of the process of step S612 in FIG. 4 in the process of downloading update software which is described in the first embodiment.

In FIG. 11, the update case management unit 112 confirms the presence or absence of an update case with respect to the vehicle 200 which is an inquiry source, by the same method as that of step S612 in FIG. 4 (step S1301). Next, the update case management unit 112 determines whether or not there is an update case, on the basis of a result of the confirmation in step S1301 (step S1302). As a result, in a case where there is no update case (S1302: No), the processing proceeds to step S1310.

On the other hand, in a case where there is an update case (S1302: Yes), the update case management unit 112 confirms a function category of an ECU to be updated in the update case, on the basis of the content of a function category 413 corresponding to the ECU in vehicle model configuration information included in update information (step S1303). Hereinafter, the function category of the ECU which is confirmed in step S1303 will be referred to as a function category Cx. That is, in the examples of the vehicle model configuration DB 122 and the functional configuration DB 123 which are illustrated in FIG. 2, the value of x in the function category Cx is any one of 1 to 5. In this embodiment, the value of x in the function category Cx is regarded as the degree of priority of the updating of software of the ECU, and the subsequent processing is executed. That is, in the example of FIG. 2, for example, the degree of priority of the updating of software is regarded as 1 for an engine ECU 240 and a steering ECU 242 of which the function category is C1, and the degree of priority of the updating of software is regarded as 5 for an audio ECU 248 of which the function category is C5. In this case, it is indicated that the degree of priority of the updating of ECU software becomes higher as the numerical value of the degree of priority becomes smaller.

Next, the update case management unit 112 retrieves a status 512 with respect to all of the vehicles 200 registered in the progress management DB 125, and extracts a record of an update case in which a progress status is incompletion of downloading, that is, a record in which the status 512 is not "completion of downloading" or the subsequent status (step S1304). A function category 413 is extracted by performing retrieval from an update case ID 510 of each record extracted in order of an update case management DB 124, a vehicle configuration DB 121, and a vehicle model configuration DB 122, thereby obtaining function categories of respective ECUs corresponding to the update case of incompletion of downloading. The number of update cases of incompletion of downloading is counted for each of function categories C1 to C5 on the basis of the obtained function categories of the respective ECUs (step S1305). The proportions of the counted numbers for the respective function categories C1 to C5 to a total number of update cases of incompletion of downloading are calculated (step S1306).

Subsequently, the update case management unit 112 calculates a total proportion (A %) of the counted numbers for a function category having the degree of priority which is equal to or higher than that of the function category Cx to which the ECU to be updated extracted in step S1303 belongs, on the basis of the proportions of the counted numbers for the respective function categories which are calculated in step S1306 (step S1307). Here, for example, in a case where the proportions of the counted numbers which are calculated in step S1306 are 24%, 12%, 28%, 20%, and 16% in order of C1 to C5 and the function category of the ECU to be updated is C3, the proportions of the counted numbers for C1, C2, and C3 are added up, and thus a calculation result of A=24+12+28=64% is obtained.

When the above-described total proportion A % is calculated in step S1307, the update case management unit 112 confirms whether or not the current remaining power of the telematics center 100 is equal to or greater than the calculated A % (step S1308). As a result, when the remaining power is equal to or greater than A % (S1308: Yes), the processing proceeds to step S1309. When the remaining power is less than A % (S1308: No), the processing proceeds to step S1310. Meanwhile, the wording "remaining power of the telematics center 100" as used herein refers to an index indicating the degree of current processing load with respect to the processing capacity of the telematics center 100. For example, a value obtained by subtracting a usage rate of a CPU of a central processing unit 110 constituting the telematics center 100 from 100%, or the like is considered as the remaining power. Meanwhile, the remaining power of the processing load of the telematics center 100 may be calculated from, for example, a usage rate of the storage device 120, a usage rate of the communication unit 140, or the like, rather than from the usage rate of the CPU, or may be calculated from a combination of the plurality of usage rates. In addition, in a case where the telematics center 100 is constructed on a cloud server, a usage charge for the cloud server, or the like may be considered.

For example, in a case where the remaining power of the telematics center 100 is 80% and A=64% as described above, the remaining power is equal to or greater than A %. Accordingly, the determination result in step S1308 is affirmative, and the processing proceeds to step S1309. In this case, the update case management unit 112 determines that the telematics center 100 can afford to process the update case confirmed in step S1301, that is, an update case for the ECU of the function category Cx (C3 in the present example). For this reason, the update case management unit determines to transmit a result of "target case is present" to the vehicle 200 which is an inquiry source (step S1309).

On the other hand, in a case where the remaining power of the telematics center 100 is 50% and A=64% as described above, the remaining power is less than A %. Accordingly, the determination result in step S1308 is negative, and the processing proceeds to step S1310. In this case, the update case management unit 112 determines that there is the update case confirmed in step S1301, that is, there is another update case to take precedence over the update case for the ECU of the function category Cx (C3 in the present example), and determines that the remaining power of the telematics center 100 has to be left. For this reason, the update case management unit determines to transmit a result of "arget case is not present" to the vehicle 200 which is an inquiry source, regardless of the actual presence of a target case (step S1310). Meanwhile, similar to the case where it is determined in step S1302 that there is no update case, the update case management unit determines to transmit a result of "target case is not present" in step S1310.

When the process of step S1309 or S1310 is executed, the update case management unit 112 advances the processing to step S613 of FIG. 4, and transmits a result determined in step S1309 or S1310 to the vehicle 200.

By the above-described processing of FIG. 11, the update case management unit 112 can manage update software to be distributed by the update software distribution unit 113 on the basis of a processing load of the telematics center 100 and information equivalent to the above-described update information of the vehicle 200 which is stored in the telematics center 100, that is, information of the function category 413 corresponding to an update case in the vehicle model configuration DB 122. In other words, even when an update case is present with respect to any vehicle 200, it can be determined whether or not updating is postponed in consideration of the remaining power of the telematics center 100 centering on the importance of a function of a target ECU of each update case. Thereby, in a situation where a plurality of update cases are registered in the telematics center 100, it is possible to preferentially distribute update software in accordance with the importance of the function of the target ECU over the plurality of update cases in consideration of a processing load of the telematics center 100. Therefore, even when a large number of update cases having a low degree of priority are registered, the degree of priority of the distribution thereof is lowered, and thus it is possible to maintain the software update system without the need for the reinforcement of the telematics center 100.

Meanwhile, in the update case confirmation processing of FIG. 11, the degree of priority may be determined by another method instead of being determined by a function category. For example, measures may be taken by separately giving information regarding the degree of priority to each update case in a manner of being associated with the update case ID 500 of the update case management DB 124. In addition, a configuration may also be introduced in which the degree of priority is automatically determined on the basis of another information such as a vehicle model ID 401 of the vehicle configuration DB 121 or a file size of update software, instead of the function category.

Further, the processing illustrated in FIG. 11 may be executed by the telematics center 100 on a regular basis rather than being executed whenever an inquiry is made from the vehicle 200 in step S612 of FIG. 4. In this case, a result determined in step S1309 or S1310 is stored in the storage device 120, and the result may be transmitted from the telematics center 100 to the vehicle 200 in response to the inquiry made from the vehicle 200, or a result transmitted from the telematics center 100 on a regular basis may be stored in the storage device 215 in vehicle 200.

Further, in this embodiment, a description has been given of an example in which the update case confirmation processing illustrated in FIG. 11 is executed in step S612 of FIG. 4 to be used as a method of controlling the presence or absence of an update case. However, in addition, for example, the update case confirmation processing of FIG. 11 may be executed in step S615 of FIG. 4 to be used as a method of temporarily denying the distribution of update software in accordance with a processing load of the telematics center or narrowing a communication band of downloading. In addition, in the first embodiment, a description has been given of an example in which a user's permission is obtained through the input and output device 234 in step S702 of FIG. 5, but it is also possible to give notice to the user's own portable terminal by means such as e-mail and to acquire the user's permission in response to the notice. In this case, the method described in FIG. 11 is used when determining the order of notice given to the user, and thus notice may be preferentially given from an update case having a high degree of priority based on a function category.

Figure 12:
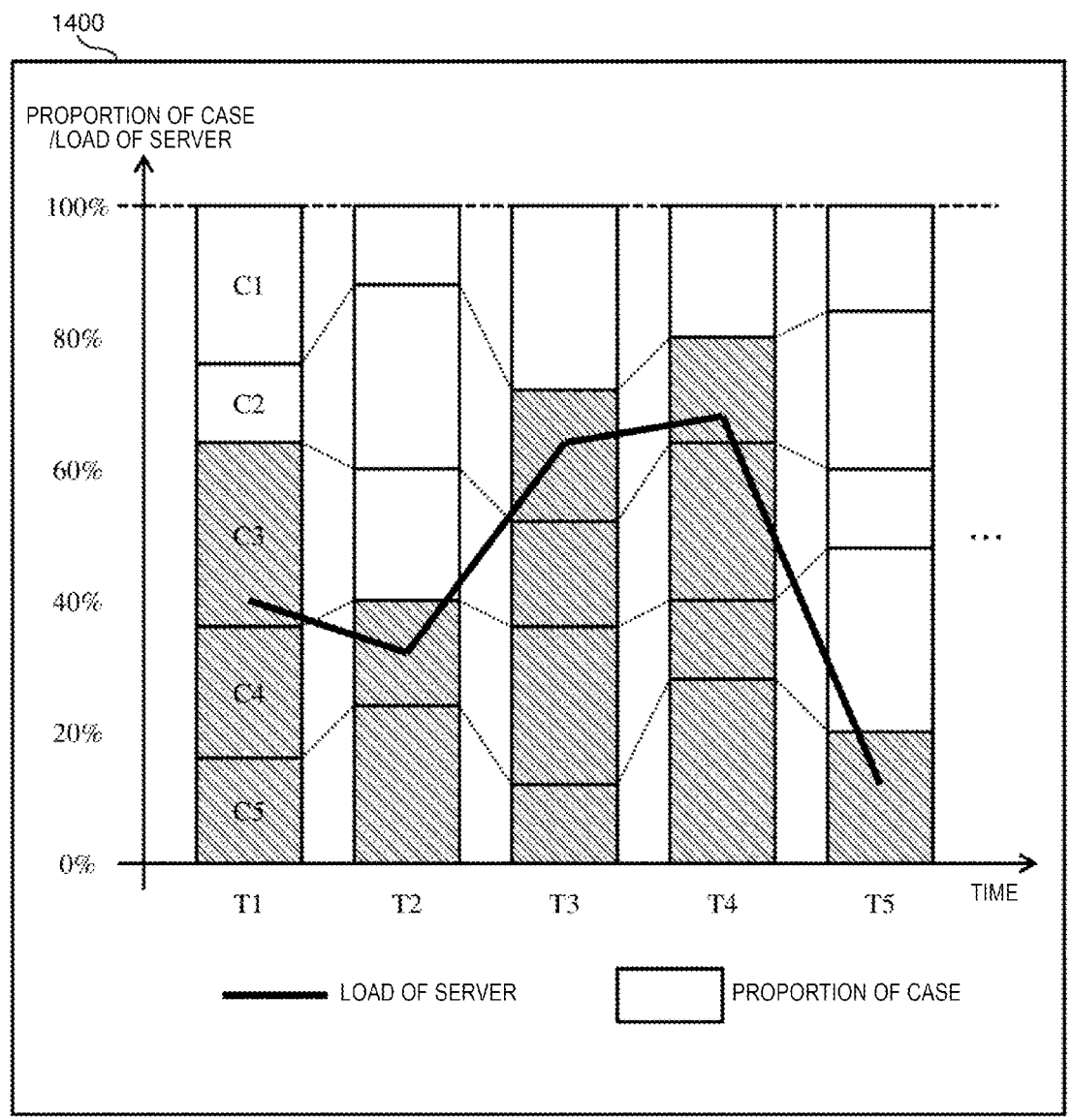
FIG. 12 is a diagram illustrating an example of a screen displayed on an input and output device of a telematics center in the third embodiment of the invention.

FIG. 12 is a diagram illustrating an example of a screen displayed on the input and output device 130 of the telematics center 100 in the third embodiment of the invention.

In a graph displayed on a screen 1400 illustrated in FIG. 12, the horizontal axis represents a time, and the vertical axis represents the proportion of a processing load for each function category with respect to the entire processing load of the telematics center 100. Meanwhile, the proportion of the processing load for each function category is equivalent to the proportion of the counted number for each function category which is calculated in step S1306 of FIG. 11. This screen 1400 assumes a case where the telematics center 100 executes the update case confirmation processing based on FIG. 11 at fixed time intervals, for example, every minute, and displays a calculation result thereof on the input and output device 130.

In the screen 1400, for example, the sum of the proportions of processing loads for the function categories C1 and C2 is approximately 50% at time T3, while the entire processing load of the telematics center 100 is approximately 65% and the remaining power of the telematics center 100 is 35%. For this reason, the processing based on FIG. 11 branches to Yes in step S1308 at the time T3 only in a case where a function category of an ECU to be updated is C1, and branches to No in the other cases of C2 to C5. Meanwhile, in FIG. 12, a function category of an ECU to be updated for which the determination in step S1308 is No is shown as half-tone dot meshing. That is, for example, only the function category C1 is not shown as half-tone dot meshing at the time T3, and the function categories C2 to C5 are shown as half-tone dot meshing.

According to the above-described third embodiment of the invention, the update case management unit 112 of the telematics center 100 manages update software distributed by the update software distribution unit 113 on the basis of a processing load of the telematics center 100 and update information stored in the telematics center 100 (steps S1303 to S1310). In this manner, it is possible to perform the management of distribution of update software to the vehicle 200 from the telematics center 100 in consideration of the processing load of the telematics center 100.

The above-described embodiments and various modification examples are merely exemplary, and the invention is not limited to the contents thereof, as long as the features of the invention are not impaired. In addition, various embodiments have been described above, but the invention is not limited to the contents thereof. Other modes which are conceivable within the technical scope of the invention are also included in the scope of the invention.

What is claimed is:

1. A software update system that manages updating of software of a control device mounted on a vehicle, the software update system comprising:
    a software updating device which is mounted on the vehicle; and
    a server which communicates with the software updating device through a network, and
    wherein the server is programmed to distribute update software for updating the software of the control device to the software updating device and update information specifying a moving condition and an operational limitation of the vehicle in a case where the updating of the software of the control device is not successful and the control device is in an inoperable state, and to distribute recovery software to the software updating device for returning the software of the control device to a state before the updating,
    wherein the software updating device includes a storage device that stores the update software and the update information distributed from the server, and the software updating device is programmed to update the software of the control device by using the update software stored in the storage device,
    wherein the software updating device is programmed to:
    in the case where the updating of the software of the control device is not successful and the control device is in an inoperable state, perform a recovery process on the basis of the update information, and
    wherein, in the recovery process, the software updating device is programmed to:
    determine whether or not the software updating device is capable of communicating with the server at a current location,
    in a case where the software updating device is determined to be capable of communicating with the server at the current location, request the server to distribute the recovery software,
    in a case where the software updating device is determined to be incapable of communicating with the server at the current location, determine whether or not the vehicle is movable on the basis of the moving condition specified in the update information,
    in a case where the vehicle is determined to be movable, prompt a user to move the vehicle to a position where the software updating device is capable of communicating with the server and prompt the user of the operational limitation of the vehicle specified in the update information, and
    in a case where the software updating device and the server are set to be in a communicable state after moving to the position, request the server to distribute the recovery software, and
    receive the recovery software from the server.

2. The software update system according to claim 1,
    wherein the software updating device is programmed to:
    determine whether or not the vehicle is movable during the updating of the software of the control device on the basis of the update information, and
    in a case where the vehicle is determined to be movable, update the software of the control device during traveling of the vehicle.

3. The software update system according to claim 1,
    wherein the server is programmed to manage the update software to be distributed to the software updating device on the basis of a processing load of the server and update information stored in the server.

4. The software update system according to claim 1,
    wherein a plurality of control devices mounted on the vehicle are grouped into a plurality of function categories in accordance with a respective degree of influence on the operation of the vehicle, and
    wherein the update information specifies one of the plurality of function categories to which the control device to be updated by the update software belongs.

5. The software update system according to claim 4,
    wherein the server is programmed to display the one of the function categories to which the control device to be updated by the update software belongs on a screen of a display device.

6. The software update system according to claim 1,
    wherein the server is programmed to:
    in response to receiving the request from the software updating device, distribute the recovery software to the software updating device for returning the software of the control device to the state before the updating, and
    wherein, in the recovery process, the software updating device is programmed to:
    receive the recovery software from the server,
    return the software of the control device to the state before the updating by using the recovery software, and
    in a case where the software of the control device fails to return to the state before the updating, display information of a dealer of the vehicle to the user.

7. The software update system according to claim 1,
    wherein, in the recovery process, the software updating device is programmed to:
    in the case where the software updating device is determined to be incapable of communicating with the server, determine whether or not the vehicle is manually movable by the user on the basis of the update information in the recovery processing.

8. A software update method that manages updating of software of a control device mounted on a vehicle, the software update method executed by a software updating device which is mounted on the vehicle and a server which communicates with the software updating device through a network, the software update method comprising:
    distributing, from the server, update software for updating the software of the control device and update information specifying a moving condition and an operational limitation of the vehicle in a case where the updating of the software of the control device is not successful and the control device is in an inoperable state over the network to the software updating device, storing, by the software updating device, the update software and the update information distributed from the server in a storage device, updating, by the software updating device, the software of the control device by using the update software stored in the storage device, in a case where the updating of the software of the control device is not successful and the control device is in an inoperable state, performing, by the software updating device, a recovery process in the case where the updating of the software of the control device is not successful on the basis of the update information, and wherein the recovery process includes:

determining whether or not the software updating device is capable of communicating with the server at a current location, in a case where the software updating device is capable of communicating with the server at the current location, requesting the server to distribute the recovery software in the recovery processing, and, receiving, from the server, the recovery software, in a case where the software updating device is incapable of communicating with the server at the current location:

determining whether or not the vehicle is movable from the current location on the basis of the moving condition specified in the update information, when the vehicle is determined to be movable, prompting a user to move the vehicle to a position where the software updating device is capable of communicating with the server and prompting the user of the operational limitation of the vehicle specified in the update information, requesting the server to distribute the recovery software when the software updating device and the server are set to be in a communicable state after moving to the position, and receiving, from the server, the recovery software, and returning the software of the control device to a state before the updating by using the recovery software.

\* \* \* \* \*